United States Patent
Rhodes

(10) Patent No.: US 11,206,754 B2
(45) Date of Patent: Dec. 28, 2021

(54) DEPTH SENSING WITH ABSOLUTE POSITION AND TEMPERATURE COMPENSATION

(71) Applicant: Deere & Company, Moline, IL (US)

(72) Inventor: Michael Rhodes, Richfield, MN (US)

(73) Assignee: DEERE & COMPANY, Moline, IL (US)

( * ) Notice: Subject to any disclaimer, the term of this patent is extended or adjusted under 35 U.S.C. 154(b) by 152 days.

(21) Appl. No.: 15/901,297

(22) Filed: Feb. 21, 2018

(65) Prior Publication Data
US 2019/0254222 A1    Aug. 22, 2019

(51) Int. Cl.
| | |
|---|---|
| A01B 63/00 | (2006.01) |
| A01B 63/24 | (2006.01) |
| A01C 7/10 | (2006.01) |
| A01C 7/20 | (2006.01) |
| A01C 5/06 | (2006.01) |

(52) U.S. Cl.
CPC ............ *A01B 63/002* (2013.01); *A01B 63/24* (2013.01); *A01C 7/107* (2013.01); *A01C 7/203* (2013.01); *A01C 5/064* (2013.01)

(58) Field of Classification Search
CPC ..... A01B 63/002; A01B 63/008; A01B 63/16; A01B 63/24; A01C 7/203
USPC .................................... 172/4, 395, 430, 518
See application file for complete search history.

(56) References Cited

U.S. PATENT DOCUMENTS

| | | | |
|---|---|---|---|
| 2,192,948 A | 3/1940 | White | |
| 4,445,923 A | 5/1984 | Shetterly | |
| 4,850,454 A | 7/1989 | Korody | |
| 5,479,992 A | 1/1996 | Bassett | |
| 5,591,945 A | 1/1997 | Kent | |
| 6,076,611 A * | 6/2000 | Rozendaal | A01B 63/22 172/2 |
| 6,216,794 B1 | 4/2001 | Buchl | |
| 6,530,334 B2 * | 3/2003 | Hagny | A01C 7/006 111/189 |
| 7,360,495 B1 | 4/2008 | Martin | |
| 9,107,337 B2 * | 8/2015 | Bassett | A01B 71/02 |

(Continued)

FOREIGN PATENT DOCUMENTS

| | | |
|---|---|---|
| EP | 2322026 A1 | 5/2011 |
| EP | 3072763 A1 | 9/2016 |

(Continued)

OTHER PUBLICATIONS

European Patent Office Extended Search Report for Application No. 18203540.2 dated Mar. 19, 2019 (11 pages).

(Continued)

*Primary Examiner* — Gary S Hartmann
(74) *Attorney, Agent, or Firm* — Michael Best & Friedrich LLP

(57) ABSTRACT

An agricultural machine includes a frame, an arm pivotally coupled to the frame at a first end of the arm, and a target element on the first end of the arm. The target element is configured to rotate with the arm, and includes an outer surface and a projection extending away from the outer surface. The agricultural machine also includes a first sensor fixed to the frame. The first sensor is configured to detect the outer surface. The agricultural machine also includes a second sensor fixed to the frame. The second sensor is configured to detect the projection.

15 Claims, 23 Drawing Sheets

(56) References Cited

U.S. PATENT DOCUMENTS

| | | | |
|---|---|---|---|
| 9,232,687 B2* | 1/2016 | Bassett | A01C 5/06 |
| 9,554,504 B2* | 1/2017 | Houck | A01C 7/203 |
| 9,693,496 B2* | 7/2017 | Tevs | A01B 76/00 |
| 9,750,174 B2* | 9/2017 | Sauder | A01C 7/203 |
| 9,968,030 B2* | 5/2018 | Kowalchuk | A01C 7/205 |
| 10,462,956 B2* | 11/2019 | Hamilton | A01C 7/205 |
| 2002/0174813 A1 | 11/2002 | Hagny | |
| 2005/0155536 A1 | 7/2005 | Wendte et al. | |
| 2011/0313575 A1 | 12/2011 | Kowalchuk et al. | |
| 2014/0048296 A1 | 2/2014 | Bassett | |
| 2014/0116735 A1 | 5/2014 | Bassett | |
| 2014/0303854 A1 | 10/2014 | Zielke | |
| 2015/0230391 A1 | 8/2015 | Houck | |
| 2015/0237790 A1 | 8/2015 | Redden et al. | |
| 2016/0348529 A1 | 12/2016 | Emmons et al. | |
| 2017/0086349 A1 | 3/2017 | Tevs et al. | |
| 2017/0094894 A1 | 4/2017 | Heim et al. | |
| 2017/0303465 A1 | 10/2017 | Koch et al. | |
| 2017/0367251 A1 | 12/2017 | Hamilton | |
| 2018/0092287 A1* | 4/2018 | Garner | A01C 7/205 |
| 2018/0092288 A1* | 4/2018 | Garner | A01C 15/006 |
| 2018/0092289 A1* | 4/2018 | Wonderlich | A01C 7/205 |
| 2018/0092290 A1* | 4/2018 | Hubner | A01C 7/205 |
| 2018/0092292 A1* | 4/2018 | Rhodes | A01C 7/203 |
| 2018/0092293 A1* | 4/2018 | Rhodes | A01C 5/064 |
| 2018/0114305 A1 | 4/2018 | Strnad et al. | |
| 2018/0120082 A1 | 5/2018 | Rhodes et al. | |
| 2019/0124824 A1* | 5/2019 | Hubner | A01C 7/205 |

FOREIGN PATENT DOCUMENTS

| | | |
|---|---|---|
| EP | 3213617 A1 | 9/2017 |
| EP | 3300567 A1 | 4/2018 |
| EP | 3300569 A1 | 4/2018 |
| WO | 2008086283 A2 | 7/2008 |
| WO | 2014/066654 | 5/2014 |
| WO | 2014066650 A1 | 5/2014 |
| WO | 2014066654 A1 | 5/2014 |

OTHER PUBLICATIONS

United States Patent Office Action for U.S. Appl. No. 15/692,538 dated May 20, 2019 (13 pages).

European Patent Office Extended Search Report for Application No. 19152876.9 dated Jul. 4, 2019 (11 pages).

EP17194407.7 Extended European Search Report dated Jan. 8, 2018 (9 pages).

\* cited by examiner

DEPTH SENSING WITH ABSOLUTE POSITION AND TEMPERATURE COMPENSATION

BACKGROUND

The present disclosure relates to systems and methods for planting seeds, in particular with a row crop planter.

Various factors affect crop yields. One factor, for example, is seed depth in a furrow. A productive crop yield is typically one that grows and emerges uniformly from the soil. Understanding planting depth provides valuable information that may be used to generate a productive crop yield.

SUMMARY

In one aspect, the disclosure provides a seeding machine that includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a depth sensor coupled to both the first gauge wheel arm and the second gauge wheel arm, the depth sensor including a differential gearbox and a single potentiometer.

In another aspect, the disclosure provides a seeding machine that includes a frame, a gauge wheel arm pivotally coupled to the frame, a gauge wheel coupled to the gauge wheel arm, and an inductive proximity sensor coupled to the frame to detect a rotational position of the gauge wheel arm.

In another aspect, the disclosure provides a seeding machine that includes a frame, a gauge wheel arm pivotally coupled to the frame and rotatable about a pivot axis, a gauge wheel coupled to the gauge wheel arm, and a position sensor assembly to detect a rotational position of the gauge wheel arm about the pivot axis. The position sensor assembly includes both a sensing element positioned on and carried by the frame and an eccentric surface on the gauge wheel arm. The sensing element includes a sensing surface that faces the pivot axis.

In another aspect, the disclosure provides a seeding machine that includes a frame, a gauge wheel arm pivotally coupled to the frame, a gauge wheel coupled to the gauge wheel arm, and a position sensor assembly to detect a rotational position of the gauge wheel arm. The position sensor assembly includes an eccentric surface.

In another aspect, the disclosure provides a seeding machine that includes a frame, a gauge wheel arm pivotally coupled to the frame and rotatable about a pivot axis, a gauge wheel coupled to the gauge wheel arm, and a position sensor assembly to detect a rotational position of the gauge wheel arm about the pivot axis. The position sensor assembly includes a sensing surface and a sensed surface. When the gauge wheel arm rotates, the sensing surface remains parallel to the sensed surface.

In another aspect, the disclosure provides a seeding machine that includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor and a linkage coupled between the first gauge wheel arm and the position sensor.

In another aspect, the disclosure provides a seeding machine that includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor disposed between the first gauge wheel arm and the second gauge wheel arm such that the position sensor is at least partially concealed from view between the first and second gauge wheels when viewing the seeding machine along an axis of rotation of the first gauge wheel.

In another aspect, the disclosure provides a seeding machine that includes a frame, a furrow opener coupled to the frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a first position sensor to detect a rotational movement of the first gauge wheel arm, the position sensor assembly further including a second position sensor to detect wear of the furrow opener.

In another aspect, the disclosure provides a seeding machine that includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor to detect a rotational movement of the first gauge wheel arm, and a controller in communication with the position sensor, wherein the position sensor outputs signals corresponding to a position of the gauge wheel arm, and wherein the controller is configured to provide an alert if the first gauge wheel is missing or if the first gauge wheel arm has remained in a same position for a predetermined period of time.

In another aspect, the disclosure provides a seeding machine that includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a first position sensor coupled to the first gauge wheel arm and a second position sensor coupled to the second gauge wheel arm.

In another aspect, the disclosure provides a seeding machine that includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor that includes a single sensing array positioned between the first gauge wheel arm and the second gauge wheel arm.

In another aspect, the disclosure provides a seeding machine that includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor that includes an accelerometer coupled to the first gauge wheel arm to measure movement of the first gauge wheel arm.

In another aspect, the disclosure provides a seeding machine that includes a main frame, and a row unit coupled to the main frame. The row unit has a row unit sub-frame. A gauge wheel arm is pivotally coupled to the sub-frame, a gauge wheel is coupled to the gauge wheel arm, and a seed firmer is coupled to the sub-frame. The seeding machine also includes a first position sensor coupled to at least one of the sub-frame or the gauge wheel arm. The first position sensor detects a rotational position of the gauge wheel arm relative to the sub-frame. The seeding machine also includes a second position sensor coupled to at least one of the sub-frame or the seed firmer.

In another aspect, the disclosure provides a seeding machine that includes a main frame, and a row unit coupled to the main frame. The row unit has a row unit sub-frame. A gauge wheel arm is pivotally coupled to the sub-frame, and a gauge wheel is coupled to the gauge wheel arm. The gauge wheel has an edge. The seeding machine also includes a position sensor coupled to the sub-frame. The position sensor detects a position of the edge of the gauge wheel.

In another aspect, the disclosure provides a seeding machine that includes a main frame, and a row unit coupled to the main frame. The row unit has a row unit sub-frame. A first gauge wheel arm is pivotally coupled to the sub-frame, a first gauge wheel is coupled to the first gauge wheel arm, a second gauge wheel arm is pivotally coupled to the sub-frame, and a second gauge wheel is coupled to the second gauge wheel arm. The seeding machine also includes a position sensor disposed between the first gauge wheel arm and the second gauge wheel arm.

In another aspect, the disclosure provides a seeding machine that includes a main frame, and a row unit coupled to the main frame. The row unit has a row unit sub-frame. A gauge wheel arm is pivotally coupled to the sub-frame, and a gauge wheel is coupled to the gauge wheel arm. A seed firmer is pivotally coupled to the sub-frame. The seeding machine also includes a first position sensor coupled to at least one of the sub-frame or the gauge wheel arm, a second position sensor coupled to at least one of the sub-frame or the seed firmer, and a controller coupled to both the first position sensor and the second position sensor. The controller receives signals from both the first position sensor and the second position sensor, and calculates a depth of a seed furrow based on the signals from both the first position sensor and the second position sensor.

In another aspect, the disclosure provides a seeding machine that includes a frame, a furrow opener coupled to the frame, and a position sensor assembly having a position sensor that faces the furrow opener and detects wear of the furrow opener.

In another aspect, the disclosure provides a seeding machine that includes a frame, a ground following device coupled to the frame, a furrow following device coupled to the frame, and a position sensor assembly having a first position sensor that detects movement of the ground following device and a second position sensor that detects movement of the furrow following device.

In another aspect, the disclosure provides a row unit for a seeding machine. The row unit includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a depth sensor having a potentiometer coupled to the first gauge wheel arm.

In another aspect, the disclosure provides a depth sensor. The depth sensor includes a differential gearbox having a housing, a first bevel gear disposed at least partially within the housing, a second bevel gear disposed at least partially within the housing, a third bevel gear disposed at least partially within the housing, and a fourth bevel gear disposed at least partially within the housing. The first bevel gear, the second bevel gear, the third bevel gear, and the fourth bevel gear are in mutual engagement with one another. The third bevel gear and the fourth bevel gear are coupled to the housing with a pin structure. The depth sensor also includes a ring gear fixed to the housing, a fifth bevel gear engaged with the ring gear, and a single potentiometer, wherein the fifth bevel gear is coupled to the single potentiometer.

In another aspect, the disclosure provides a row unit for a seeding machine. The row unit includes a frame, a gauge wheel arm pivotally coupled to the frame, a gauge wheel coupled to the gauge wheel arm, and a position sensor assembly configured to detect a gap corresponding to a rotational position of the gauge wheel arm. The position sensor assembly includes a sensing target surface. The sensing target surface is at least one of an eccentric surface or a cam surface.

In another aspect, the disclosure provides a gauge wheel arm for a row unit. The gauge wheel arm includes a bearing section for rotatably mounting the arm to a frame for rotation about a pivot axis, an arm portion extending from the bearing section, and a gauge wheel mounting portion at an end of the arm opposite the bearing section. The bearing section has a surface. A portion of the bearing section surface defines a sensing target surface relative to the pivot axis.

In another aspect, the disclosure provides a row unit for a seeding machine. The row unit includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor at least partially disposed between the first gauge wheel arm and the second gauge wheel arm such that the position sensor is at least partially concealed from view between the first and second gauge wheels when viewing the row unit along an axis of rotation of the first gauge wheel.

In another aspect, the disclosure provides a row unit for a seeding machine. The row unit includes a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor disposed both between the first gauge wheel arm and the second gauge wheel arm and under at least a portion of the frame.

In another aspect, the disclosure provides a row unit for a seeding machine. The row unit includes a frame, a furrow opener coupled to the frame, and a position sensor assembly having a position sensor configured to detect wear of the furrow opener.

In another aspect, the disclosure provides a row unit for a seeding machine. The row unit includes a frame, a ground following device coupled to the frame, a furrow following device coupled to the frame, and a position sensor assembly having a first position sensor configured to detect movement of the ground following device relative to the frame, and a second position sensor configured to detect movement of the furrow following device relative to the frame.

In another aspect, the disclosure provides a row unit for a seeding machine. The row unit includes a frame, a gauge wheel arm pivotally coupled to the frame, a gauge wheel coupled to the gauge wheel arm, a position sensor assembly having a position sensor configured to detect a rotational position of the gauge wheel arm, and a controller coupled to the position sensor. The controller is configured to receive a signal from the position sensor and to provide an alert based on the signal.

In another aspect, the disclosure provides a gauge wheel arm for a row unit. The gauge wheel arm includes a bearing section for rotatably mounting the gauge wheel arm to a frame of the row unit for rotation about a pivot axis, and a sensing target surface configured to be detected by a position sensor on the row unit. The sensing surface includes at least one of an eccentric surface or a cam surface.

In another aspect, the disclosure provides a gauge wheel arm for a row unit. The gauge wheel arm includes a bearing section for rotatably mounting the arm to a frame for rotation about a pivot axis, an arm portion extending from the bearing section, and a gauge wheel mounting portion at an end of the arm opposite the bearing section. The bearing section includes a raised shoulder portion having a sensing target surface. The sensing surface includes a first eccentric surface and a second eccentric surface circumferentially spaced from the first eccentric surface.

In another aspect, the disclosure provides an agricultural machine including a frame, an arm pivotally coupled to the frame at a first end of the arm, and a target element on the first end of the arm. The target element is configured to rotate with the arm, and includes an outer surface and a projection extending away from the outer surface. The agricultural machine also includes a first sensor fixed to the frame. The first sensor is configured to detect the outer surface. The agricultural machine also includes a second sensor fixed to the frame. The second sensor is configured to detect the projection.

In another aspect, the disclosure provides a system for re-calibrating a machine. The system includes an arm having a first end and a second, opposite end. The arm is configured to be coupled to a frame of the machine and to move within a range of motion during an active state of the machine. A target element is on the first end of the arm. The target element includes an outer surface and a projection extending away from the outer surface. A portion of the outer surface defines an eccentric surface along the target element. The system also includes a magnetic field sensor configured to be coupled to the frame and to detect the projection when the arm is rotated outside of the range of motion and the machine is not in the active state.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
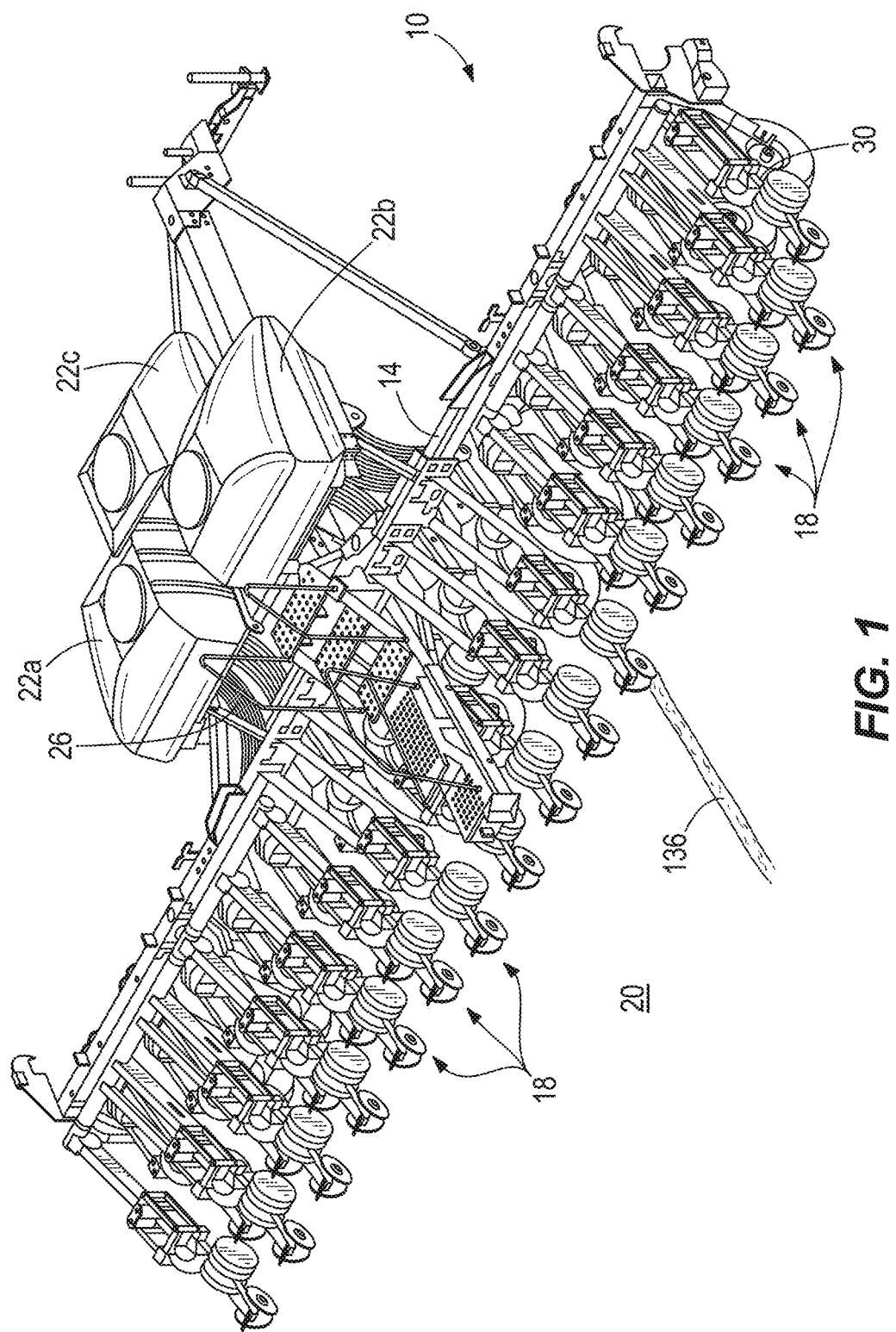
FIG. 1 is a partially schematic perspective view of a seeding machine.

FIG. 1 illustrates a seeding machine 10 (e.g., a row crop planter). The seeding machine 10 includes a main frame 14. A plurality of individual row units 18 are coupled (e.g., mounted) on a rear portion of the main frame 14, such that the row units 18 are pulled over a layer of soil 20. Alternatively, the row units 18 may be positioned forward of the frame 14 and are pushed over the soil layer, or the machine may have a combination of push and pull row units 18. Seed sources, such as storage tanks 22a-22c, are coupled to the main frame 14, and hold seed that is delivered, e.g., pneumatically or in any other suitable manner, to a mini-hopper (not shown) associated with each row unit 18. The storage tanks 22a-22c are coupled to the mini-hoppers by way of conduits 26, such as hoses, and a pressurized delivery apparatus (not shown). Each storage tank 22a-22c contains the same or different varieties of seed to be planted in the soil 20. Each row unit 18 is connected to a conduit 26 such that each row unit 18 is coupled to a storage tank 22a-22c to receive seed. As illustrated by way of example only in FIG. 1, each row unit 18 further includes its own sub-frame 30, to which various components (e.g., a furrow opener, a furrow closer, etc.) are mounted.

Figure 2:
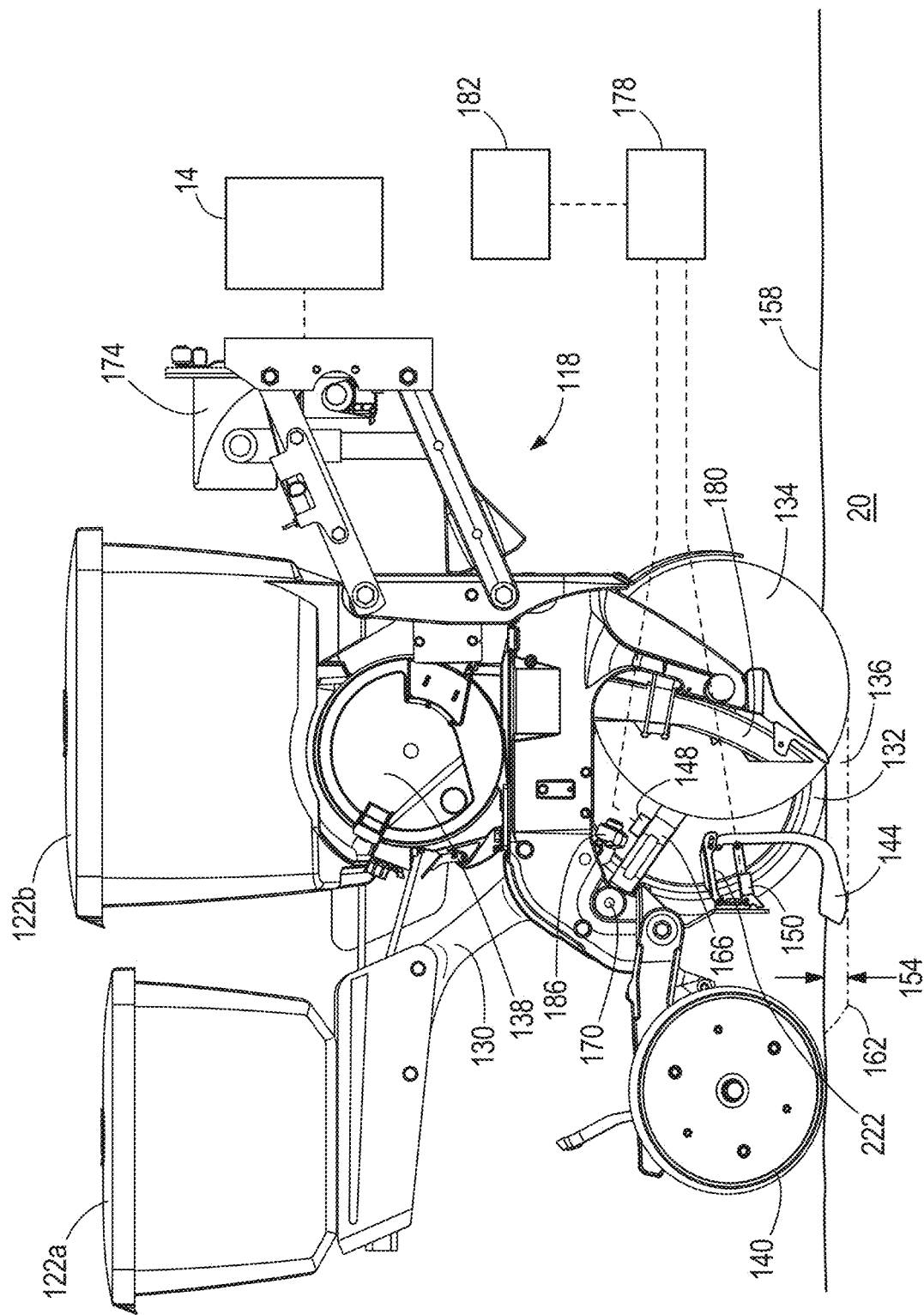
FIG. 2 is a partially schematic side view of a row unit for the seeding machine of FIG. 1, including gauge wheel arms and gauge wheels.

FIG. 2 illustrates an example of a row unit 118 that may be used in place of one of the row units 18 in FIG. 1. Similar to the row unit 18, the row unit 118 is also coupled to the main frame 14. In some constructions, a plurality of row units 118 are coupled to the main frame 14, similar to the row units 18 in FIG. 1.

As illustrated in FIG. 2, each row unit 118 includes hoppers 122a, 122b, which hold chemical and seed, respectively (as opposed to the row unit 18 receiving seed from bulk storage as in the construction illustrated in FIG. 1). The hoppers 122a, 122b are coupled to a row unit sub-frame 130. Each row unit 118 also includes a gauge wheel or wheels 132 coupled to the row unit sub-frame 130. The gauge wheel 132 contacts and rolls along the soil 20, and a furrow opener 134 (e.g., an opening wheel or blade or other structure having a stationary or rotating surface that contacts and moves soil away to form a furrow) is coupled to the row unit sub-frame 130 for forming a furrow 136 (illustrated schematically) in the soil 20. A seed metering device 138 coupled to the row unit sub-frame 130 receives seeds from the hopper 122*b* and meters and dispenses the seeds into the furrow 136. A furrow closer 140 (e.g., a closing and packing wheel or wheels or other structure having a stationary or rotating surface that contacts and presses soil 20) coupled to the row unit sub-frame 130 pushes soil around the seeds to close the furrow 136 (see FIG. 1). Each row unit 118 may also include a seed firmer 144 (e.g. an angled arm as illustrated in FIG. 2, a press wheel coupled to a press wheel arm, or other structure that firms a seed) coupled to the row unit sub-frame 130 that firms each seed and pushes it into the open furrow 136 to ensure good seed to soil contact before the furrow 136 is closed.

With continued reference to FIG. 2, each row unit 118 also includes at least one depth sensor in the form of a position sensor 148 (illustrated schematically) that is used to determine a depth 154 of the furrow 136. The depth 154 is measured from a top surface 158 of the soil 20 to a bottom 162 of the furrow 136, along a direction that is perpendicular to the top surface 158 (assuming a flat, non-inclined top surface 158). In some constructions, the depth 154 is equivalent to a distance between a bottom of the gauge wheel or wheels 132 and a bottom of the furrow opener 134.

With reference to FIGS. 2-12, in some constructions one or more of the position sensors 148 described herein detects positions of the gauge wheel arm 166 (e.g., relative to the sub-frame 130). In some constructions the position sensor or sensors 148 detect the positions of the gauge wheel arm 166 by detecting rotational movement of the gauge wheel arm 166 relative to the sub-frame 130. Specifically, the illustrated row unit 118 includes two gauge wheel arms 166. The gauge wheel arms 166 are pivotally coupled to the sub-frame 130. Each gauge wheel arm 166 is coupled to one gauge wheel 132, such that rotation of each of the gauge wheel arms 166 changes a position of each of the gauge wheels 132 relative to the sub-frame 130 and thus relative to the opener 134. As illustrated in FIG. 2, each of the gauge wheel arms 166 (only one being visible in FIG. 2) rotates about a pivot axis 170. When a downforce is applied to the row unit 118 (e.g., with a downforce adjustment mechanism 174) the downforce pushes the row unit 118 and consequently the furrow opener 134 into the soil 20 to dig the furrow 136. The gauge wheels 132 however continue to ride along the top surface 158 of the soil 20. The depth 154 of the furrow 136 therefore depends on a position of the gauge wheels 132 relative to the furrow opener 134, and the position of the gauge wheels 132 depends on a rotational position of the gauge wheel arms 166 relative to the sub-frame 130.

As illustrated in FIG. 2, in some constructions signals from the position sensor or sensors 148 are sent to a controller 178, which calculates the depth 154. The controller 178, when coupled to a global positioning system (GPS) signal processor, may generate a seed depth map and store that map for later analysis. In some constructions a display 182 is also provided (e.g., in the operator cab 12), which displays (e.g., in real time) the depth 154. The controller 178 may be positioned at various locations on seeding machine 10. For example, in some constructions the controller 178 is positioned within the operator cab 12, and signals are sent by wire or wirelessly from the position sensor or sensors 148 to the controller 178. In some constructions the position sensor or sensors 148 themselves includes a controller 178. Other constructions include different locations for the controller 178.

With reference to FIG. 2, stops 186 are also provided for each gauge wheel arm 166 to limit rotation of the gauge wheel arm 166. The stops 186 may be adjusted to a desired position to set the depth 154 in the furrow 136. The position of the stops 186 may be manually adjusted or a remote adjustment assembly may be included such as shown in U.S. Pat. No. 4,413,685, the entire contents of which are incorporated herein by reference. However, during operating conditions the gauge wheel arms 132 may not always be contacting the stops 186, and thus the actual depth 154 may not be determined solely by knowing the position of the stops 186. Additionally, the furrow opener 134 may wear during use, altering the actual depth 154. Thus, relying on the stops 186 alone is not sufficient to determine the actual depth 154 of the furrow 136 at any given time.

Figure 3:
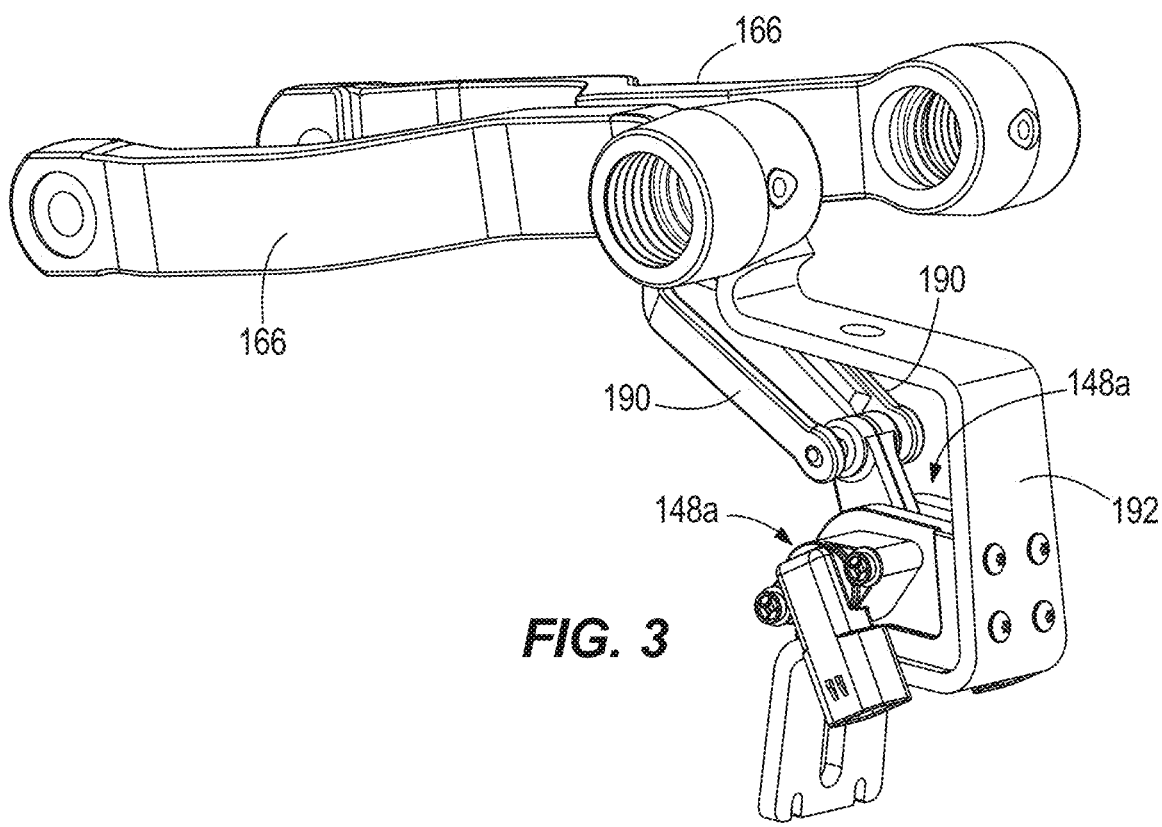
FIGS. 3 and 4 are perspective views of the gauge wheel arms and rotary potentiometer position sensors coupled to each of the gauge wheel arms.
Figure 4:
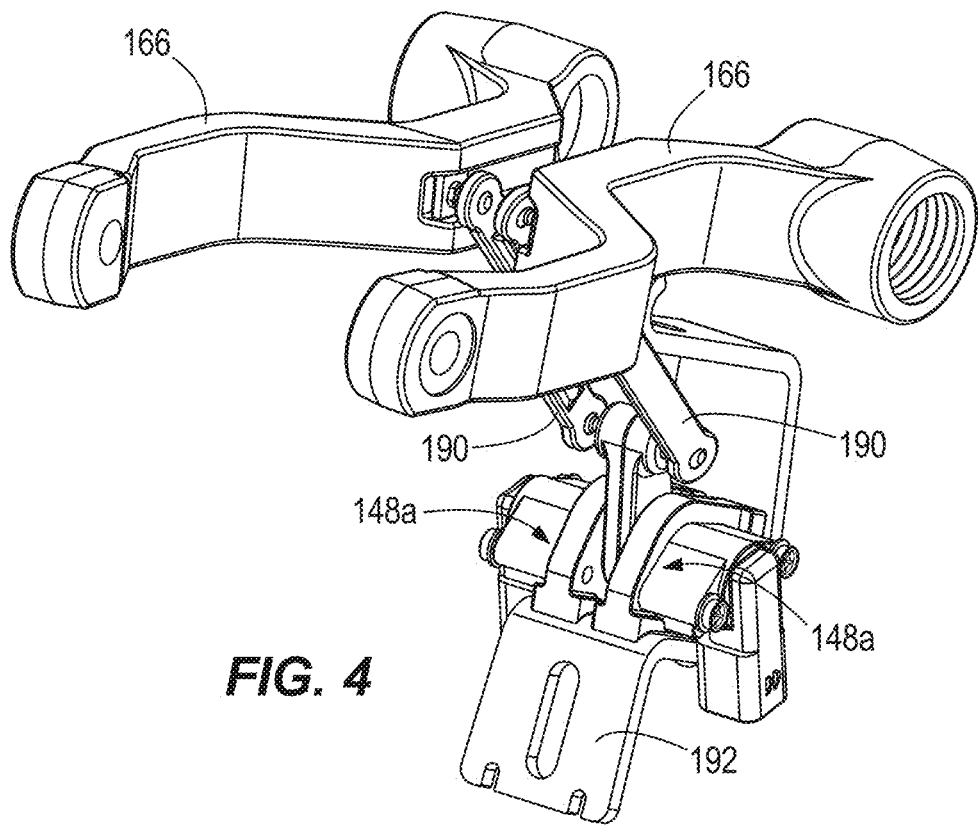

With reference to FIGS. 3 and 4, in some constructions one of the position sensors 148*a* is coupled to one gauge wheel arm 166, and another position sensor 148*a* is coupled to another gauge wheel arm 166, to separately detect the rotational positions of each of the gauge wheel arms 166 relative to the sub-frame 130. In the illustrated construction, each of the position sensors 148*a* is a rotary potentiometer with a linkage 190 coupled to the gauge wheel arm 166. However, other constructions include different types of position sensors 148*a* (e.g., ultrasonic, etc.), as well as different linkages 190 than that illustrated. The position sensors 148*a* are illustrated as being positioned between and/or below the two gauge wheel arms 166, and coupled to a bracket 192 of the sub-frame 130, such that the position sensors 148*a* are at least partially enclosed by the gauge wheels 132 (e.g., such that the position sensors 148*a* are at least partially concealed from view between the gauge wheels 132 when viewing the row unit along an axis of rotation 149 of the gauge wheel 132 or wheels 132, the axis of rotation 149 being illustrated in FIG. 5). The position sensors 148*a* are disposed below at least a portion of the sub-frame 130. However, other constructions include different locations for the position sensors 148*a*. In some constructions, a controller (e.g., the controller 178) may integrate and average signals from both of the position sensors 148*a*.

Figure 5:
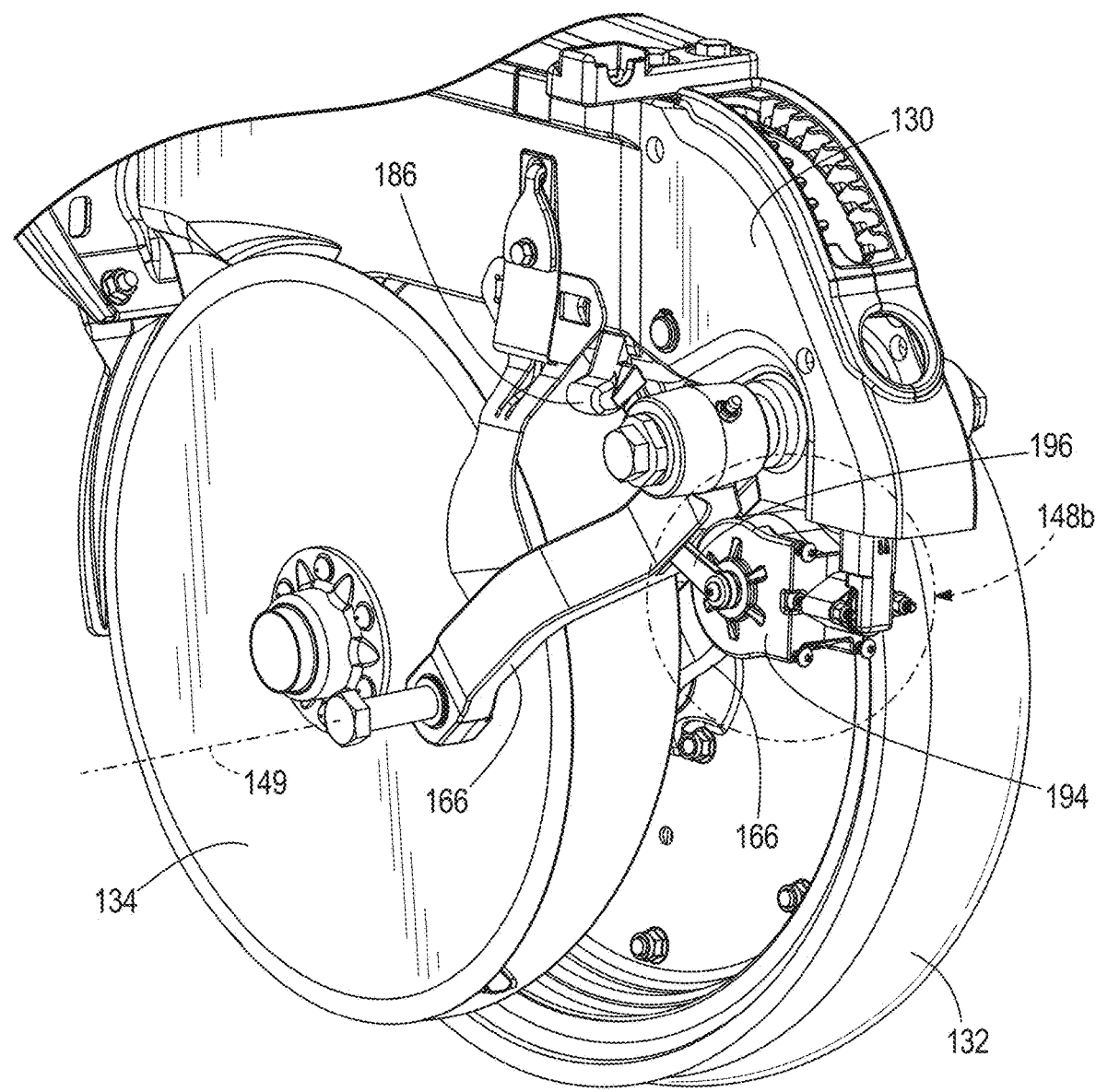
FIG. 5 is a perspective view of the gauge wheel arms and a schematic illustration of a position sensor that includes a mechanical averaging differential gearbox coupled to both gauge wheel arms.

With reference to FIG. 5, in some constructions a single position sensor 148*b* (illustrated schematically in FIG. 5, and in detail in FIGS. 5A-5K) is used to measure rotational positions of multiple gauge wheel arms 166 at the same time, and to average the rotational positions of the gauge wheel arms 166. Taking an average measurement is useful, for example, when the two gauge wheels 132 are riding over uneven or inclined surfaces, and where one gauge wheel 132 may be lifted up or raised slightly relative to the other gauge wheel 132.

Figure 5A:
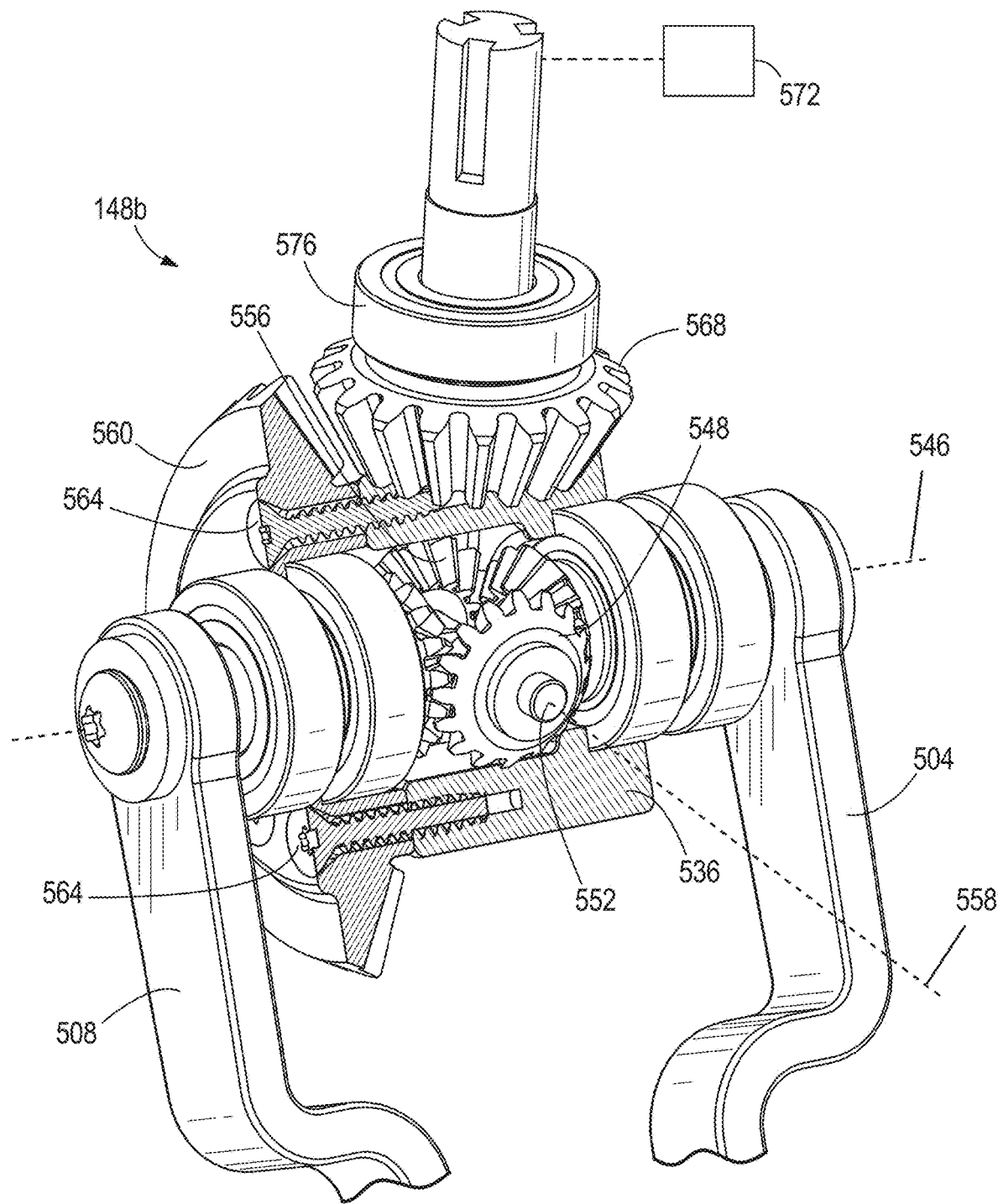
FIGS. 5A-L are front, back, and perspective views of the mechanical averaging differential gearbox.
Figure 5B:
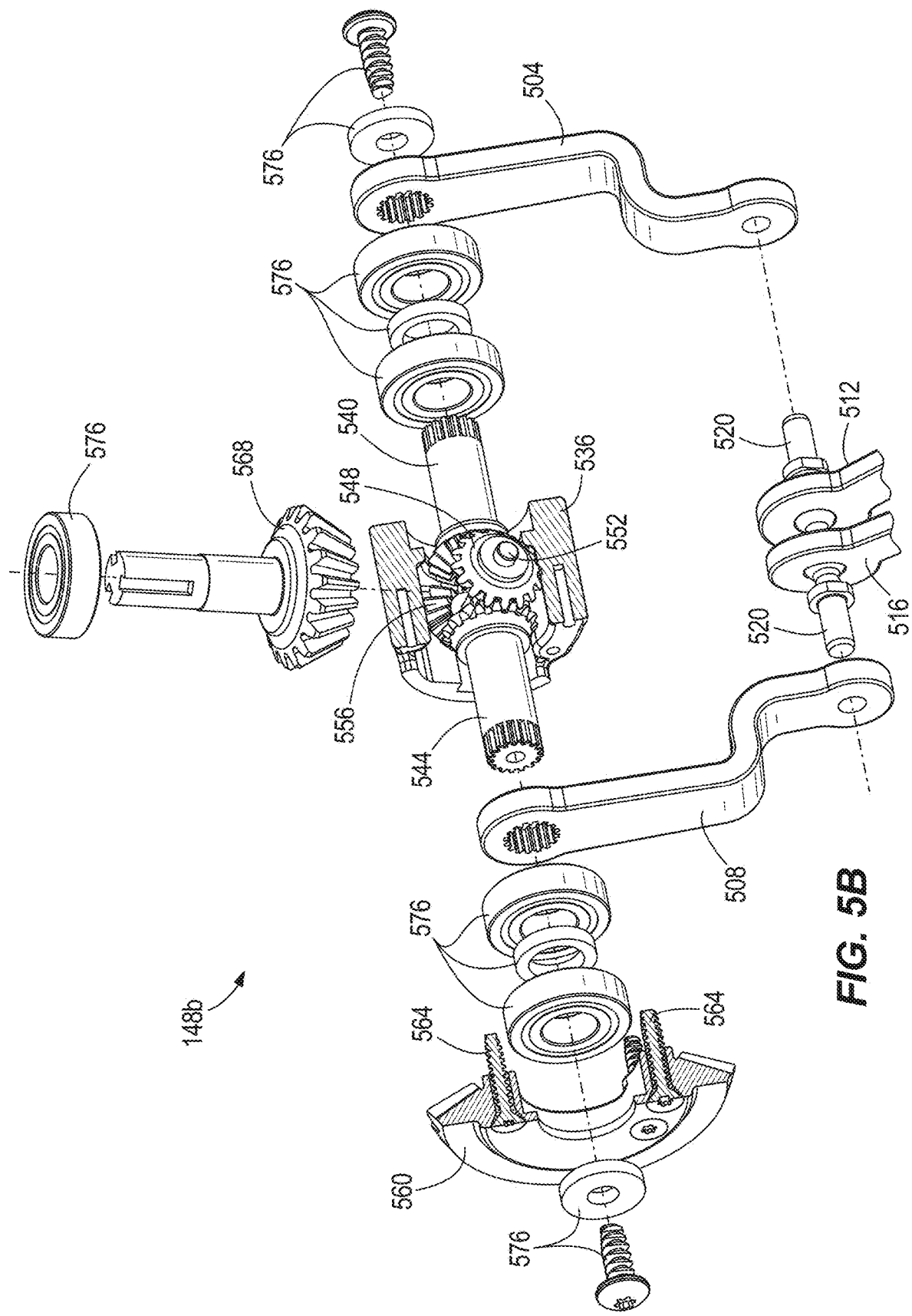
Figure 5C:
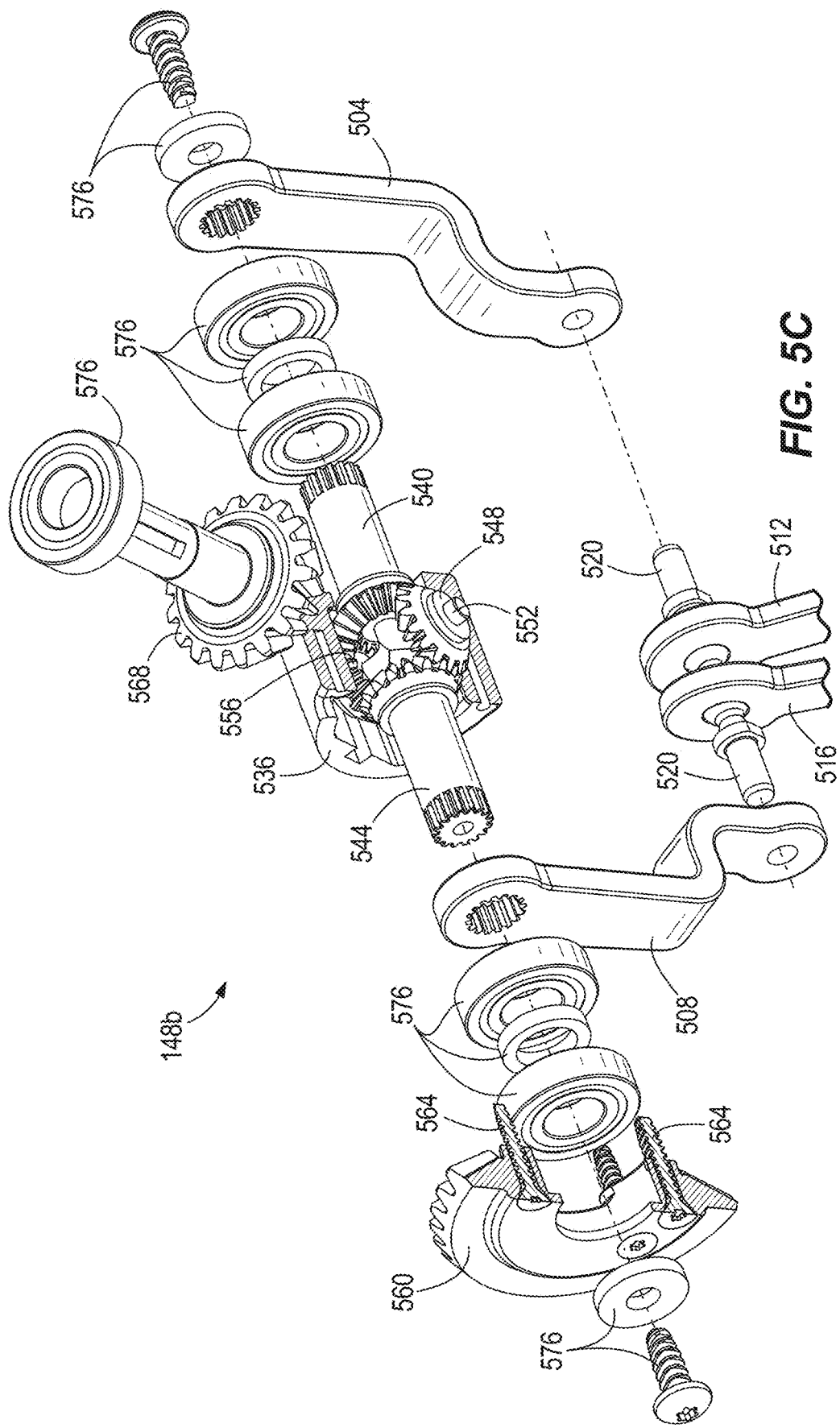
Figure 5D:
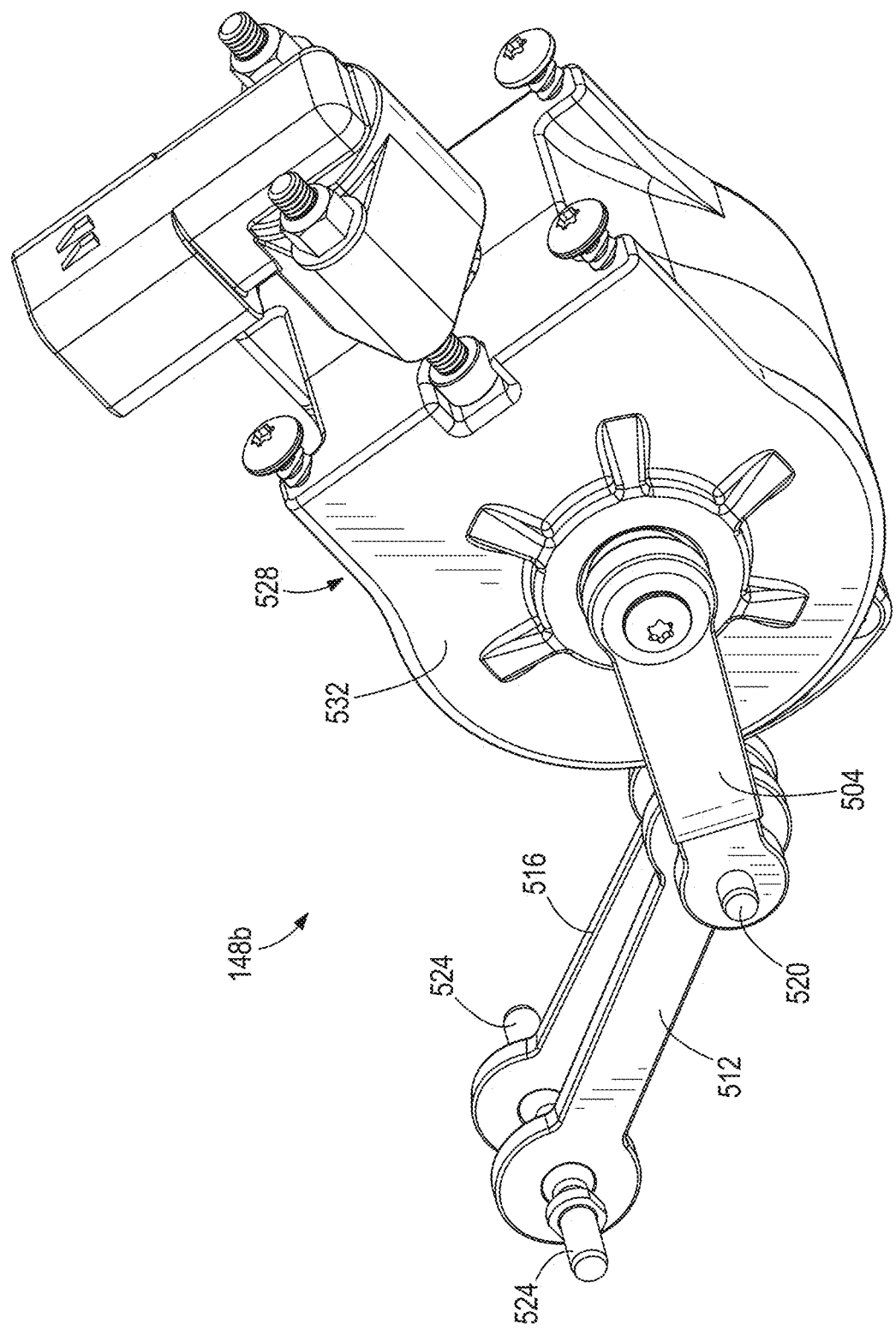
Figure 5E:
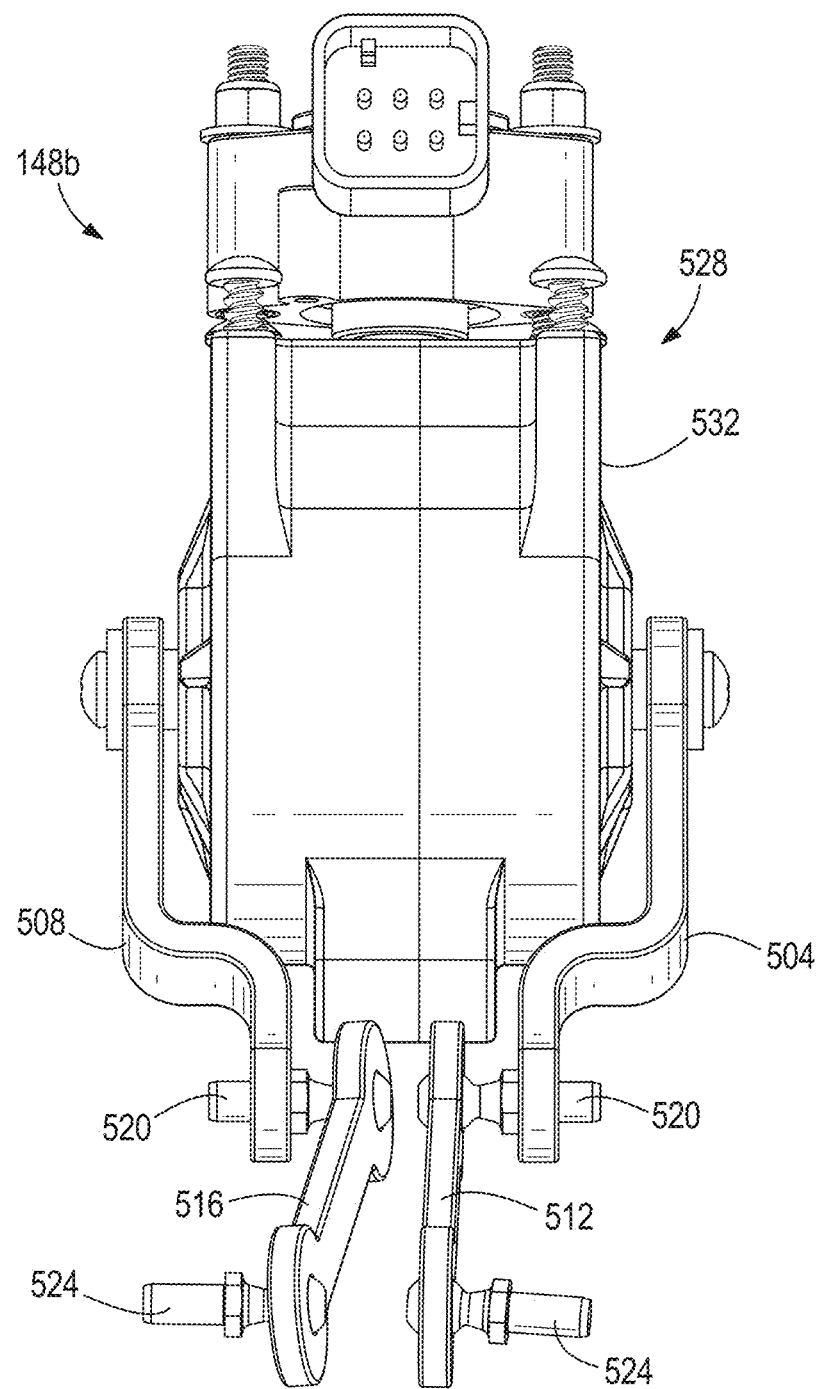
Figure 5F:
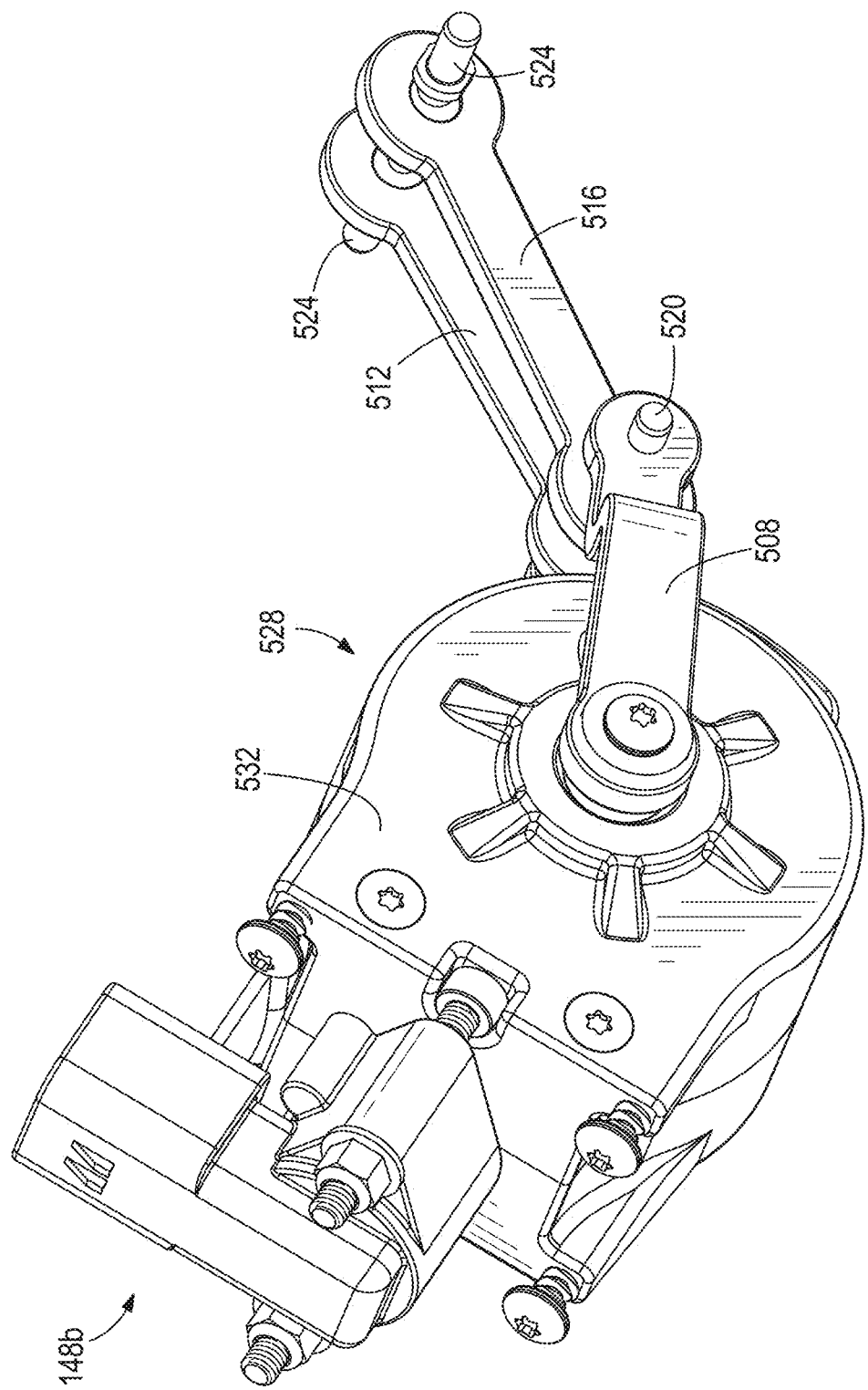
Figure 5G:
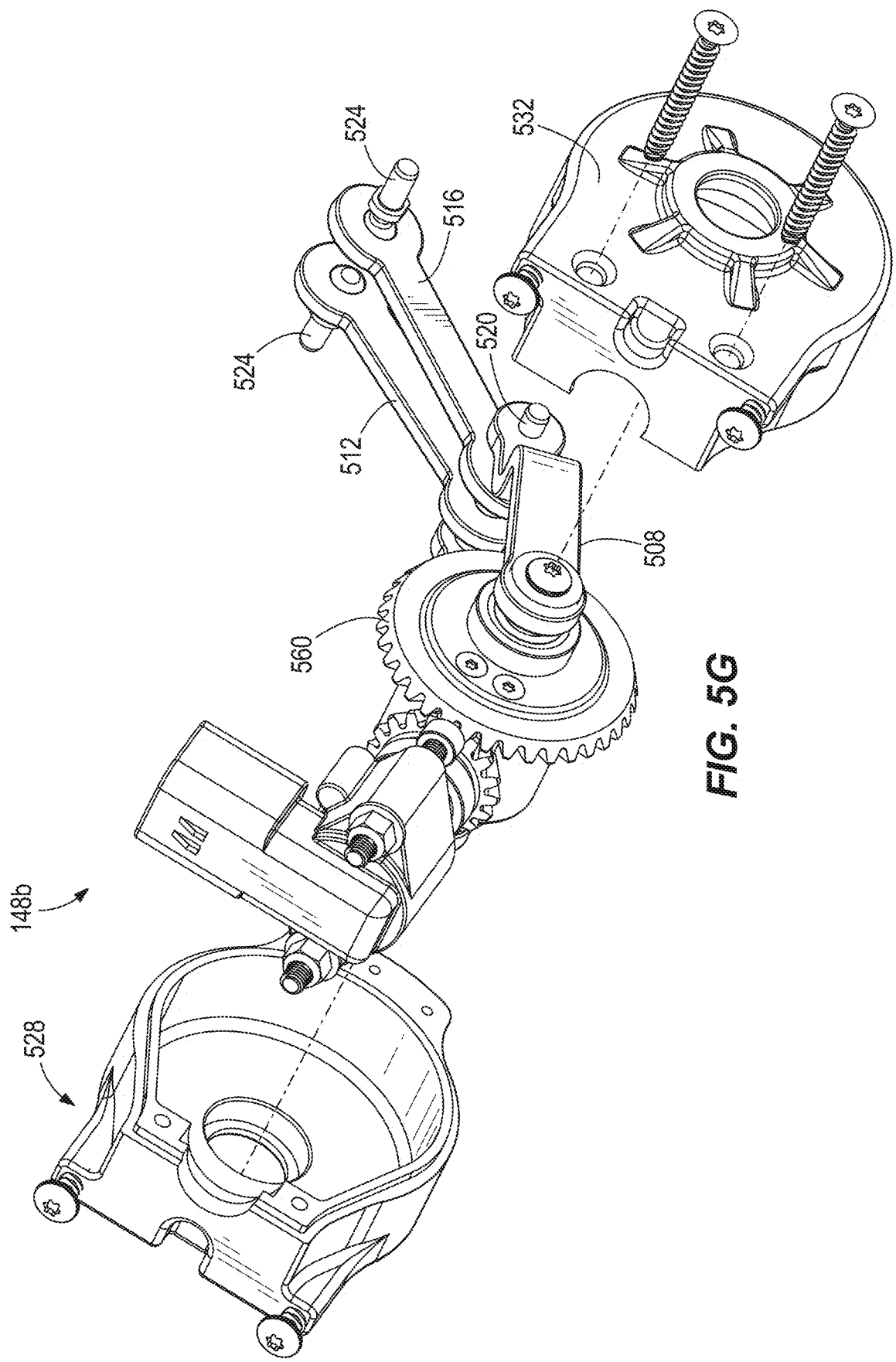
Figure 5H:
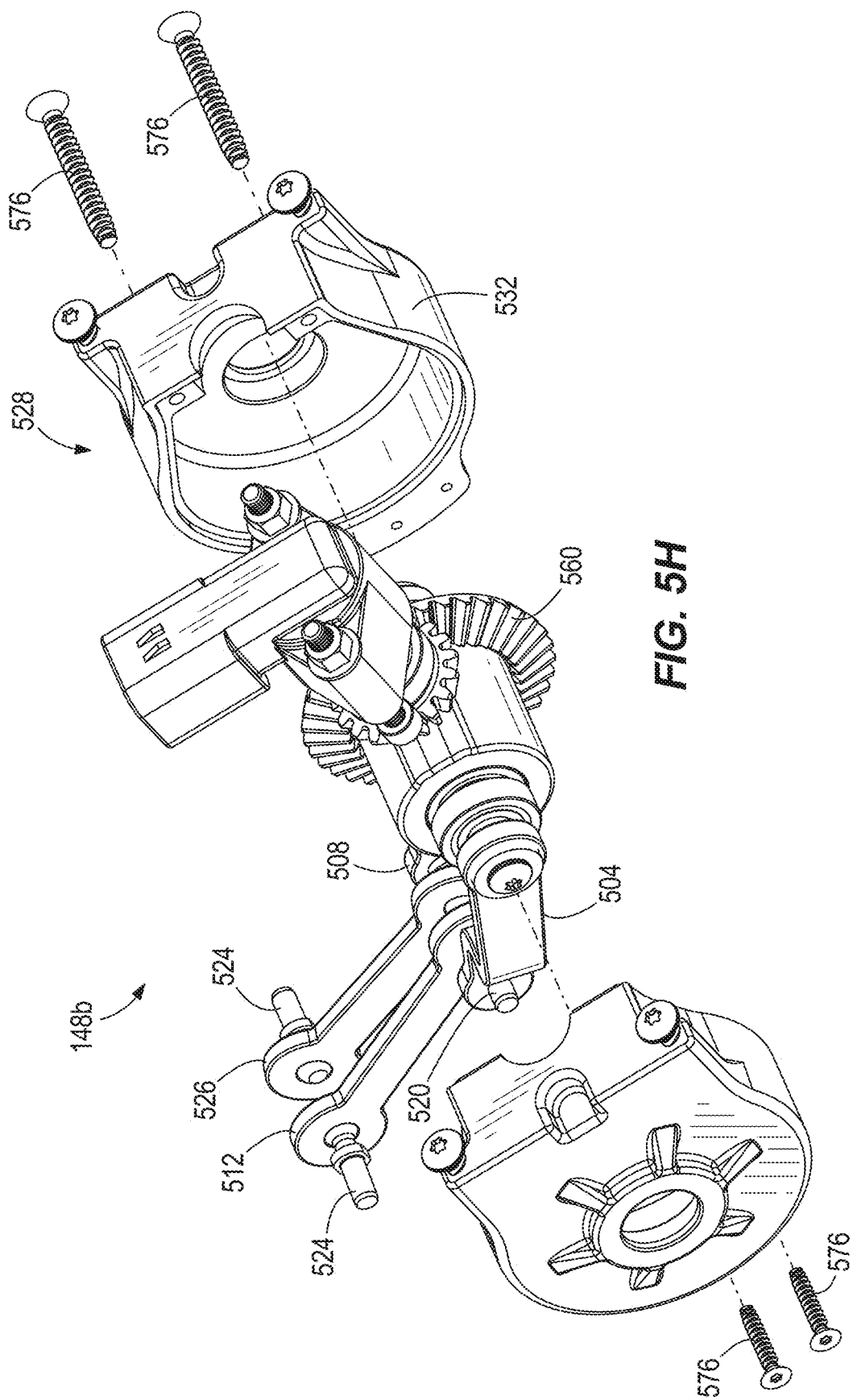
Figure 5I:
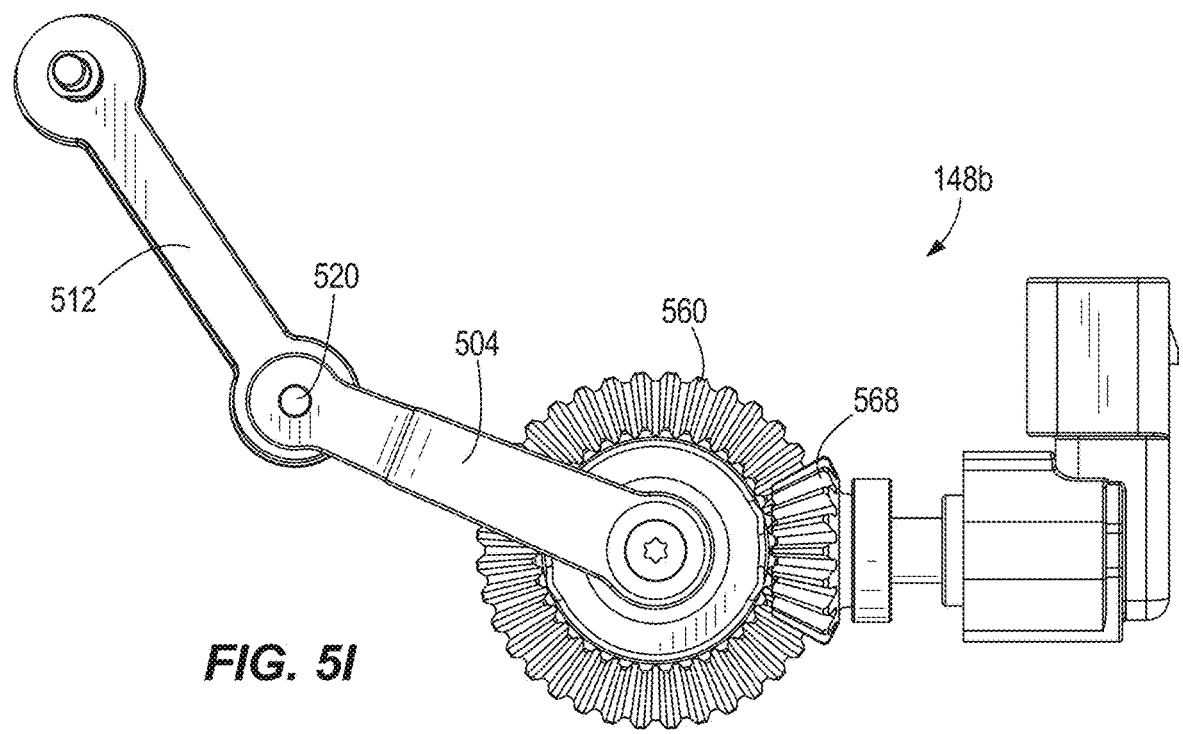
Figure 5J:
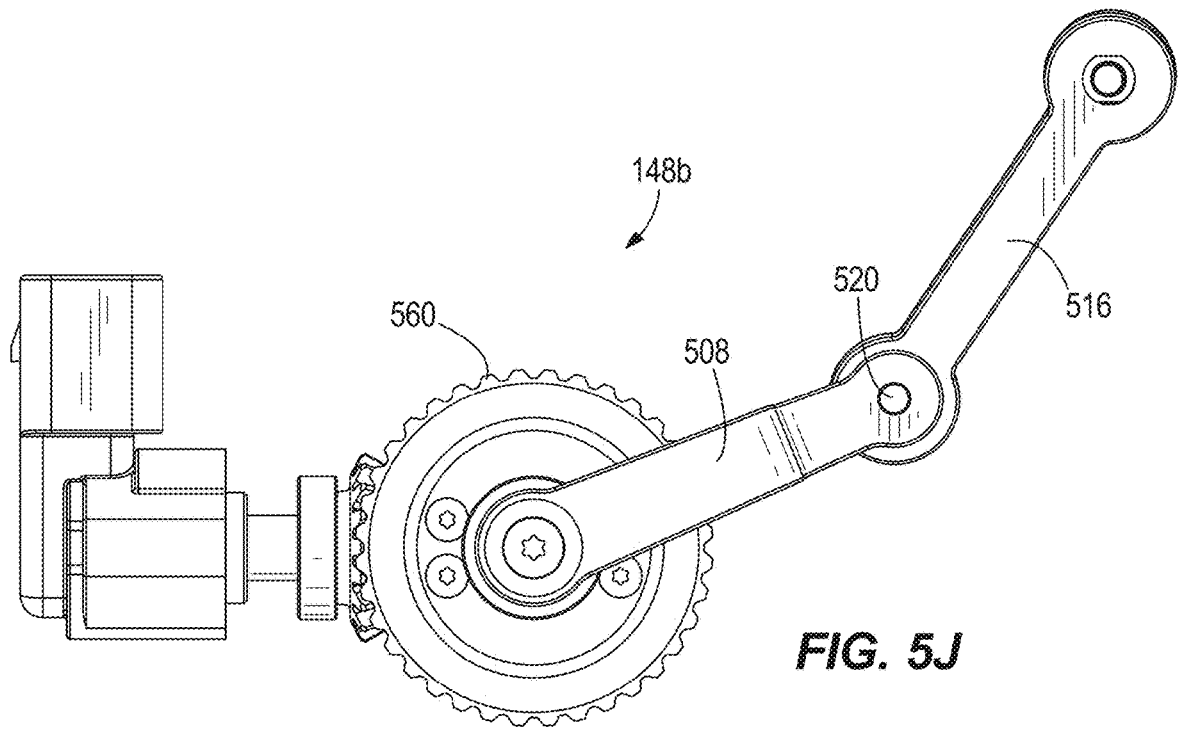
Figure 5K:
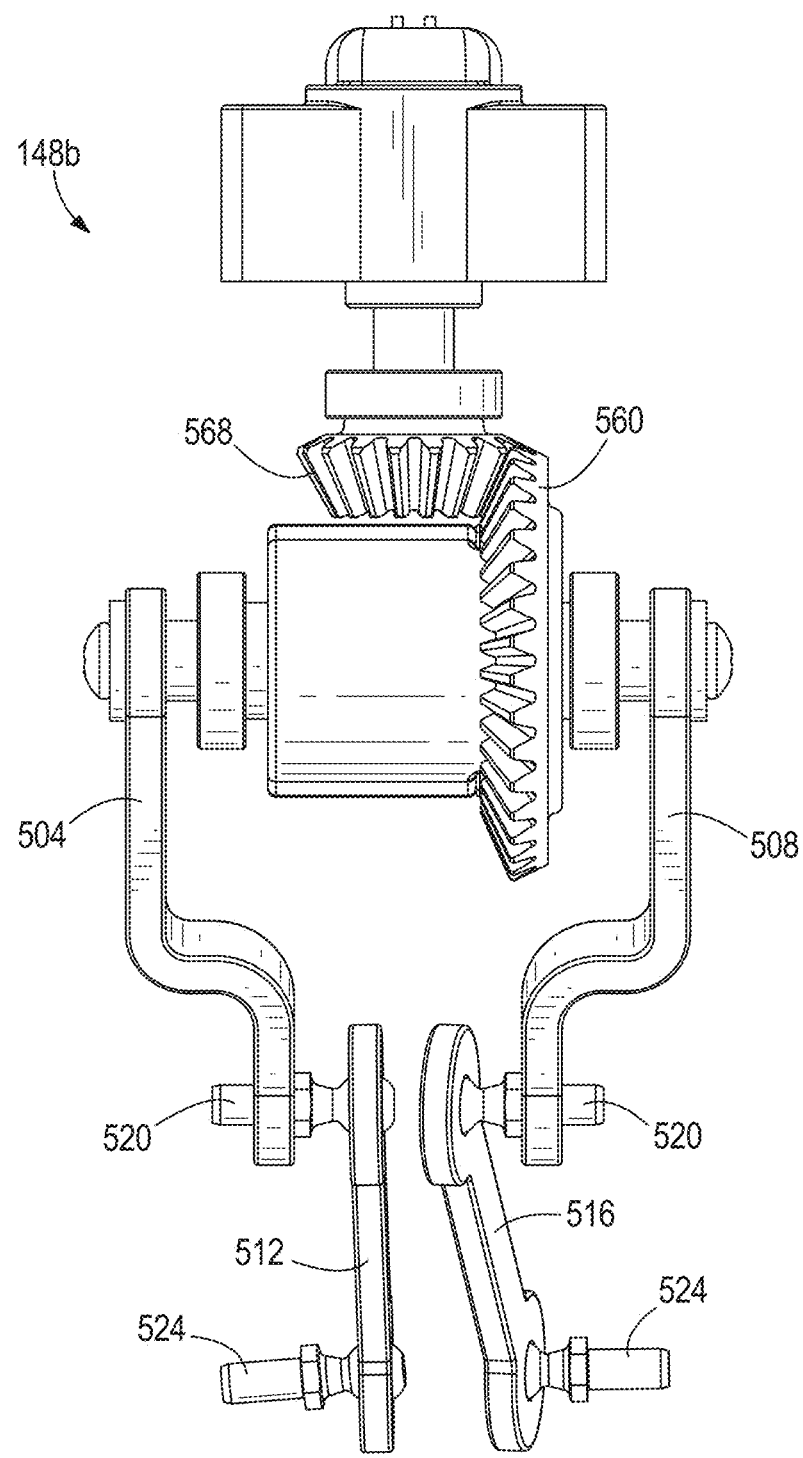

With reference to FIGS. 5A-5K, in the illustrated construction the position sensor 148*b* includes a first link arm 504 and a second link arm 508. The first link arm 504 and the second link arm 508 each generally have an S-shaped or curvilinear profile, although other constructions include differently shaped profiles. The position sensor 148*b* further includes a third link arm 512 pivotally coupled to the first link arm 504, and a fourth link arm 516 pivotally coupled to the second link arm 508 with pins 520. The third link arm 512 and the fourth link arm 516 each generally have a linear shaped profile, although other constructions include differently shaped profiles. The third link arm 512 and the fourth link arm 516 are pivotally coupled to the gauge wheel arms 166 with pins 524 (FIG. 5D).

With continued reference to FIGS. 5A-5K, the position sensor 148*b* further includes a differential gearbox 528 (FIG.

5D) coupled to the first link arm 504 and the second link arm 508. The differential gearbox 528 includes an outer housing 532. As illustrated in FIGS. 5A-5C, the differential gearbox 528 further includes an inner housing 536 disposed within the outer housing 532. The inner housing 536 has a cylindrical shape, although other constructions include different shapes than that illustrated.

A first bevel gear 540 (FIGS. 5B and 5C) is coupled to the first link 504 and is disposed at least partially within the inner housing 536. In the illustrated construction the first bevel gear 540 is coupled to the first link 504 via a spline connection, although other constructions include different connections. The first bevel gear 540 rotates with the first link 504.

A second bevel gear 544 (FIGS. 5B and 5C) is coupled to the second link 508 and is disposed at least partially within the inner housing 536. In the illustrated construction the second bevel gear 544 is coupled to the second link 508 via a spline connection, although other constructions include different connections. The second bevel gear 544 rotates with the second link 508. The first bevel gear 540 and the second bevel gear 544 each rotate about a common axis 546 (FIG. 5A).

A third bevel gear 548 (FIGS. 5A-5C) is disposed at least partially within the inner housing 536. The third bevel gear 548 is pivotally coupled to the inner housing 536 via a pin structure 552.

Figure 5L:
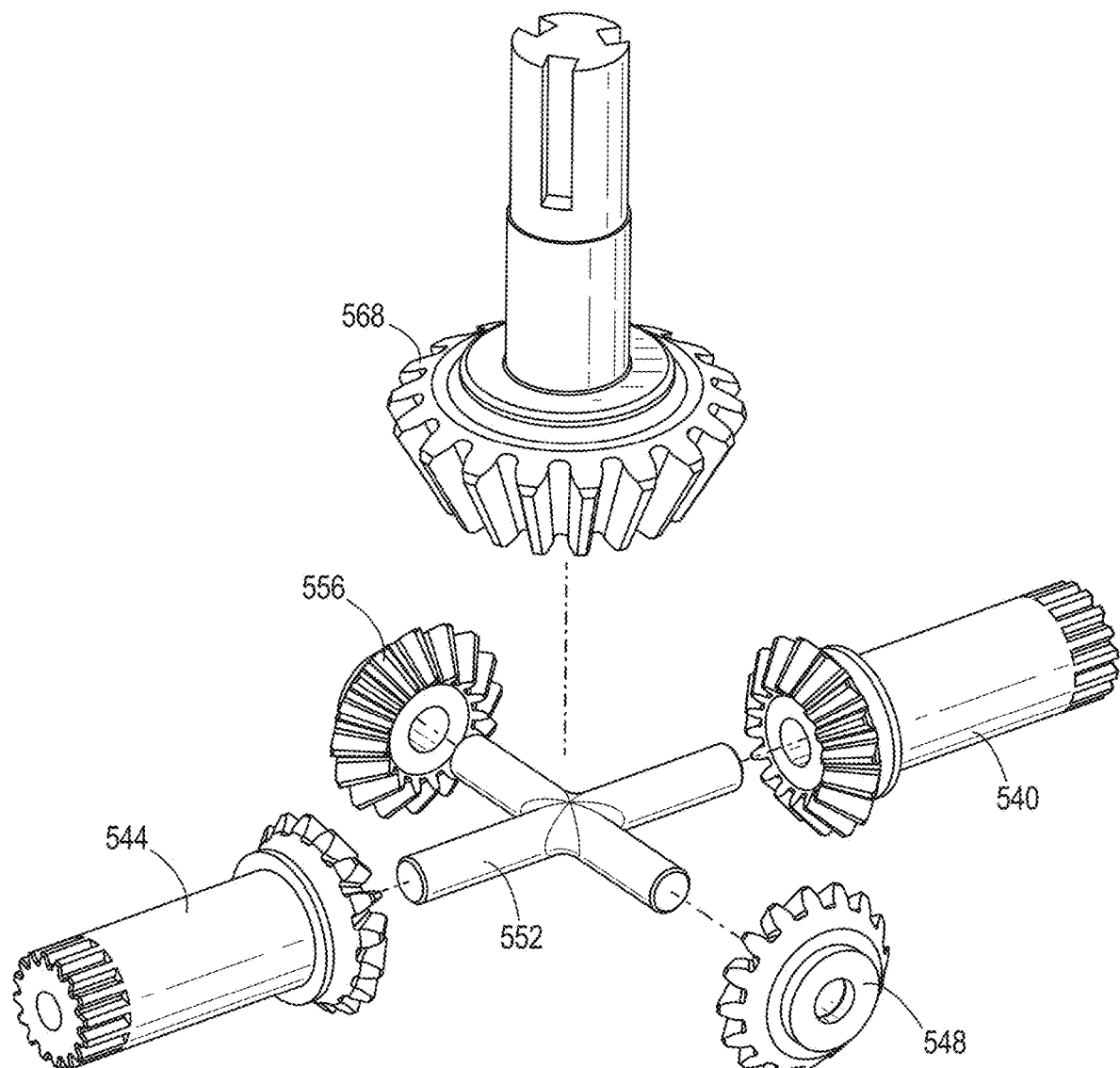

A fourth bevel gear 556 (FIGS. 5A-5C) is disposed at least partially within the inner housing 536. The fourth bevel gear 556 is pivotally coupled to the inner housing 536 with the same pin structure 552. In some constructions the pin structure 552 also extends into the first bevel gear 540 and the second bevel gear 544 (i.e., forms a cross-shaped bevel gear support structure, as illustrated in FIG. 5L). The third bevel gear 548 and the fourth bevel gear 556 each rotate about a second common axis 558 (FIG. 5A) that is perpendicular to the first common axis 546. In some constructions the first bevel gear 540, the second bevel gear 544, the third bevel gear 548, and the fourth bevel gear 556 are each the same size.

With continued reference to FIGS. 5A-5C, the position sensor 148b further includes a ring gear 560 that is fixed to the inner housing 536. In the illustrated construction the ring gear 560 is fixed to the inner housing with fasteners 564, although in other constructions the ring gear 560 may be fixed in other manners, or may be integrally formed as a single piece with the inner housing 536.

The position sensor 148b further includes a larger, fifth bevel gear 568 that engages with the ring gear 560. The fifth bevel gear 568 is coupled to a single potentiometer 572 (illustrated schematically in FIG. 5A).

As illustrated in FIGS. 5B and 5C, various other bearings, washers, and/or fasteners 576 are provided to complete the connections between the components described above, and to facilitate movement of the components as described further below.

During use, the row unit 18 travels along the surface of a field. If the field contains rocks, debris, or other obstacles, one of the gauge wheels 132 may ride up and over one of the obstacles. When the one gauge wheel 132 encounters the obstacle, the gauge wheel 132 rises, causing a rotation of the gauge wheel arm 166. When the gauge wheel arm 166 rotates, the third link arm 512 rotates, causing rotation of the first link arm 504.

As illustrated in FIGS. 5A-5C, the position sensor 148b senses an average position of the two gauge wheel arms 166. In particular, if the first link arm 504 in FIG. 5C is rotated out of the page (i.e., counterclockwise in FIG. 5C) due to riding over the obstacle, the first bevel gear 540 rotates counterclockwise. With the second link arm 508 held stationary, the rotation of first bevel gear 540 will cause the third bevel gear 548 to rotate and to cause rotation of the pin structure 552. The pin structure 552 is coupled to the housing 536 such that the pin structure 552 and the housing 536 rotate together, causing the ring gear 560 to rotate. This causes the fifth bevel gear 568 and shaft input to the potentiometer 572 to rotate and thus sense the rotation of the first link arm 504. The pin structure 552, however, only rotates half as much as the first bevel gear 540 so that the input into the potentiometer 572 is only half the gauge wheel arm 166 movement, and so that the input into the potentiometer 572 is therefore the average of the two gauge wheel arms 166.

If during use both the first link arm 504 and the second link arm 508 are rotated out of the page together in FIG. 5C, the third bevel gear 548 and the fourth bevel gear 556 will not rotate about their axes, but the pin structure 552 will rotate the same amount as the first bevel gear 540 and the second bevel gear 544, thus rotating the housing 536 and the ring gear 560.

If during use the first link arm 504 is rotated out of the page in FIG. 5C while the second link arm 508 is rotated in an opposite direction into the page, the first bevel gear 540 and the second bevel gear 544 will rotate in opposite directions, causing no rotation of the pin structure 552 and thus no change in the average position of the gauge wheel arms 166.

Other embodiments include various other gear arrangements and/or linkage arrangements other than that illustrated.

Figure 6:
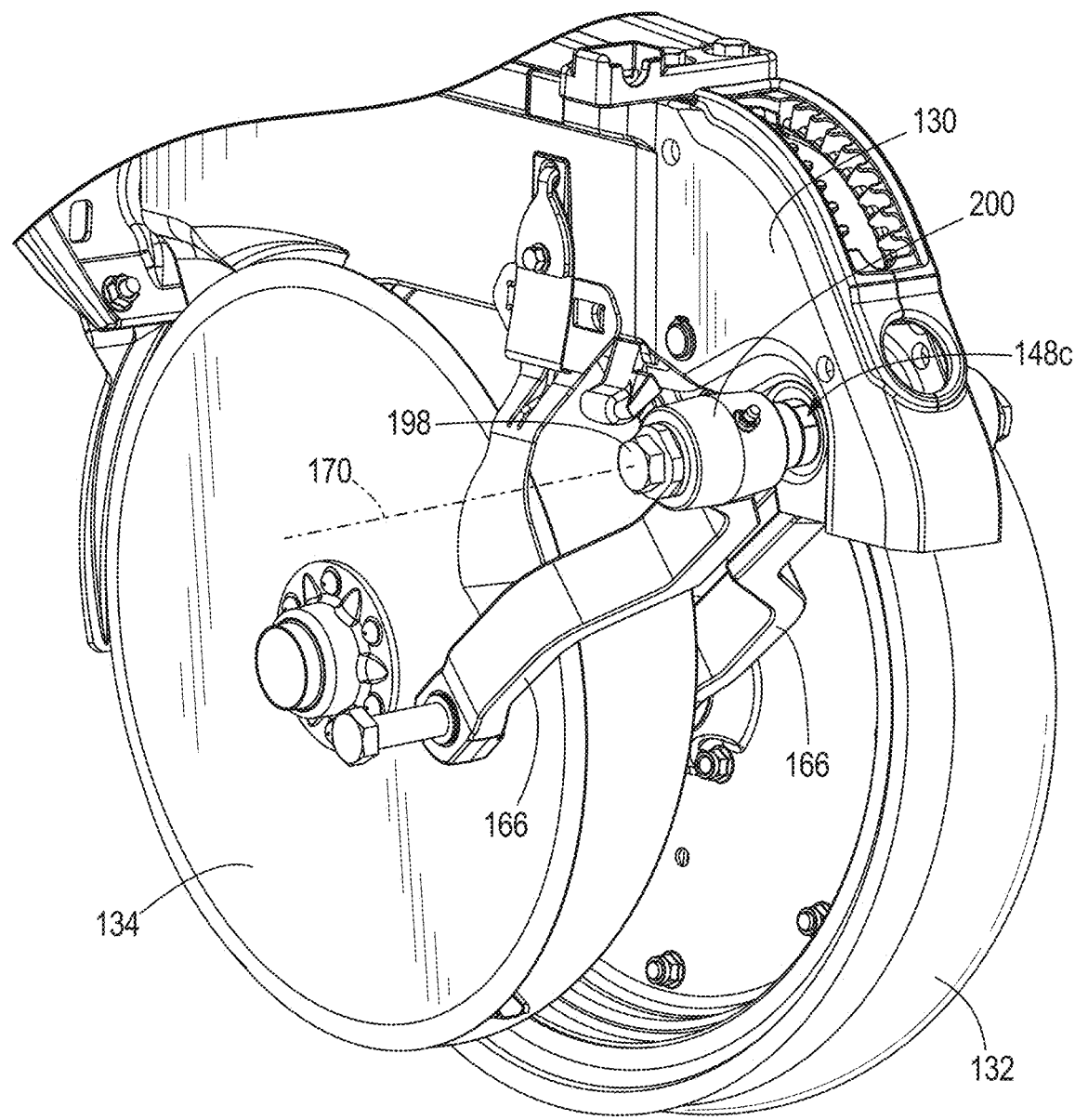
FIG. 6 is a perspective view of the gauge wheel arms and an over-the-shaft position sensor coupled to a pivot shaft for the gauge wheel arms.

With reference to FIG. 6, in some constructions the position sensor 148c is instead an over-the-shaft sensor (illustrated schematically) in the form of an angular position sensor in contact with (e.g., fixed) to a pivot shaft 198. At least one of the gage wheel arms 166 pivots about the pivot shaft 198. For example, as illustrated in FIG. 6, the pivot shaft 198 extends through a bearing section 200 of one of the gauge wheel arms 166, with the pivot axis 170 extending through the pivot shaft 198. The bearing section 200 is used to rotatably mount the gauge wheel arm 166 to the frame 130 for rotation about the pivot axis 170 (e.g., with the rest of the gauge wheel arm itself extending away from the bearing section 200 and toward the gauge wheel 132 and toward a gauge wheel mounting portion at the end of the gauge wheel arm 166). In some constructions the over-the-shaft position sensor 148d is a potentiometer that includes a linkage or other structure coupled to the gauge wheel arm 166, although other constructions include different types of sensors for measuring the angular position of the gauge wheel arm 166. In some constructions a signal relating to the rotational position of the gauge wheel arm 166 is sent from the position sensor 148c to the controller 178 to calculate the depth 154. In some constructions an over-the-shaft position sensor 148c is provided for each gauge wheel arm 166.

Figure 7:
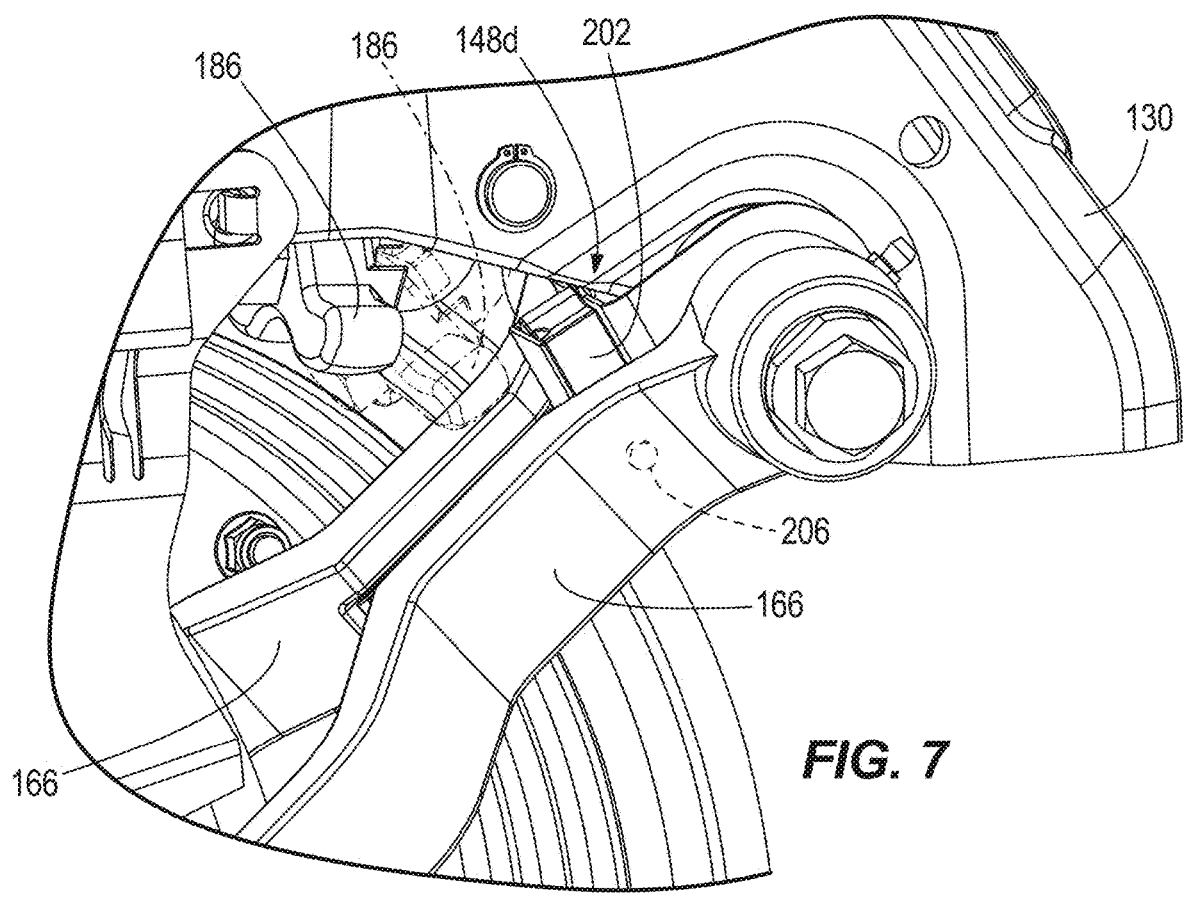
FIGS. 7 and 8 are perspective views of the gauge wheel arms and a position sensor that includes a sensing array and separate magnets that are coupled to each of the gauge wheel arms.
Figure 8:
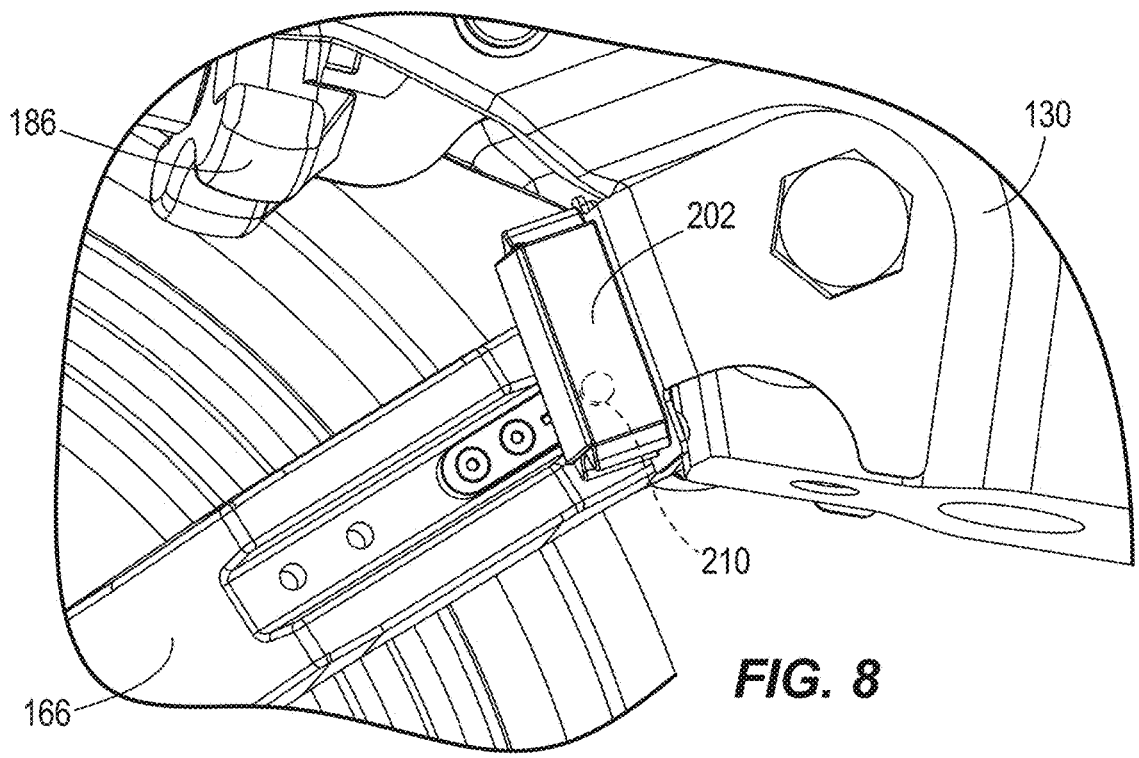

With reference to FIGS. 7 and 8, in some constructions the position sensor 148d includes a single sensing array 202 positioned between the two gauge wheel arms 166 and fixed in place on the sub-frame 130. The sensing array 202 includes for example a Hall Effect sensor(s) and/or a magneto-resistive sensor(s). The position sensor 148d further includes a first magnet 206 coupled to (e.g., disposed on or within) one of the gauge wheel arms 166, and a second magnet 210 coupled to the other gauge wheel arm 166. In other constructions the Hall Effect sensor(s) and/or magneto-resistive sensor(s) may be coupled to the gauge wheel arms 166, and the magnet or magnets may be positioned between the two gauge wheel arms 166 on the sub-frame 130. The sensing array 202 is illustrated as being positioned between the two gauge wheel arms 166, such that the sensing array 202 is at least partially enclosed by the gauge wheels 132, and disposed below at least a portion of the sub-frame 130. However, other constructions include different locations for the position sensors 148d.

When the gauge wheel arms 166 rotate, the first magnet 206 and the second magnet 210 pass by the sensing array 202 (e.g., without contacting the sensing array 202). The sensing array 202 detects the first magnet 206 and the second magnet 210, and sends one or more signals to the controller 178. Those signals are then used to determine a rotational position of each of the gauge wheel arms 166 relative to the sub-frame 130, and/or to average the rotational positions of the gauge wheel arms 166, and to then calculate the depth 154. In some constructions the sensing array 202 includes a single printed circuit board (PCB) that includes the Hall Effect sensor(s), and/or magneto-resistive sensor(s), and/or a microcontroller (e.g., the controller 178 or a separate controller that communicates with the controller 178). In some constructions more than one magnet is coupled to one of the gauge wheel arms 166. Other sensor types may be used such as ultrasonic, optical, etc.

With continued reference to FIGS. 7 and 8, and as described above, some constructions of the seeding machine 10 also include a stop 186. The stop 186 is shown in two different positions in each of FIGS. 7 and 8, for illustrative purposes, demonstrating the adjustability of the stop 186.

Figure 9:
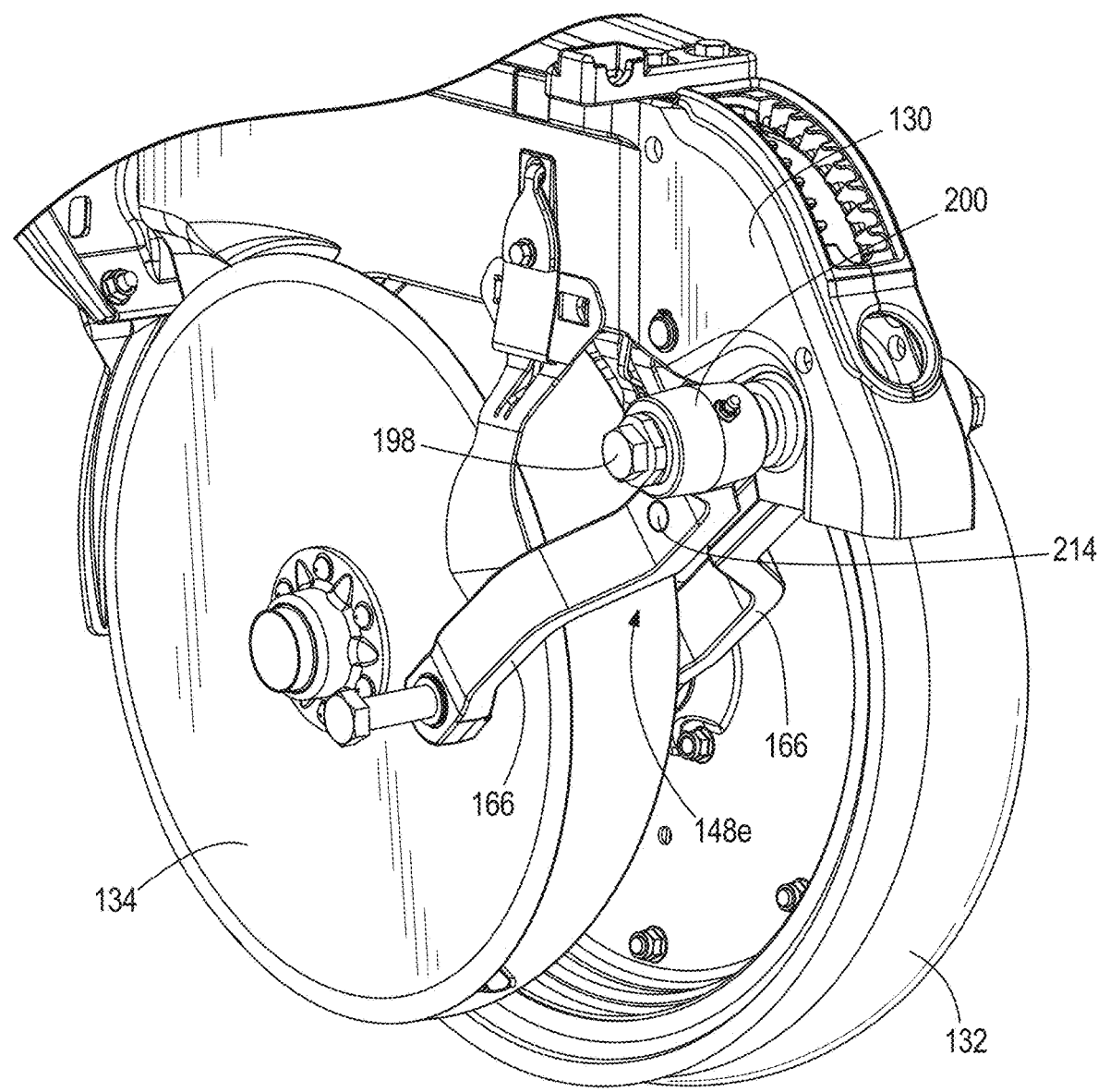
FIG. 9 is a perspective view of the gauge wheel arms and a position sensor that includes accelerometers coupled to the gauge wheel arms.

With reference to FIG. 9, in some constructions the position sensor 148e includes at least one accelerometer 214 coupled (e.g., mounted directly or otherwise directly coupled) to each gauge wheel arm 166. The accelerometer position sensors 148e determine the rotational positions of the gauge wheel arms 166. In some constructions the accelerometers 214 send signals (e.g., with wires or wirelessly) to the controller 178, and the controller 178 calculates the depth 154.

Figure 10:
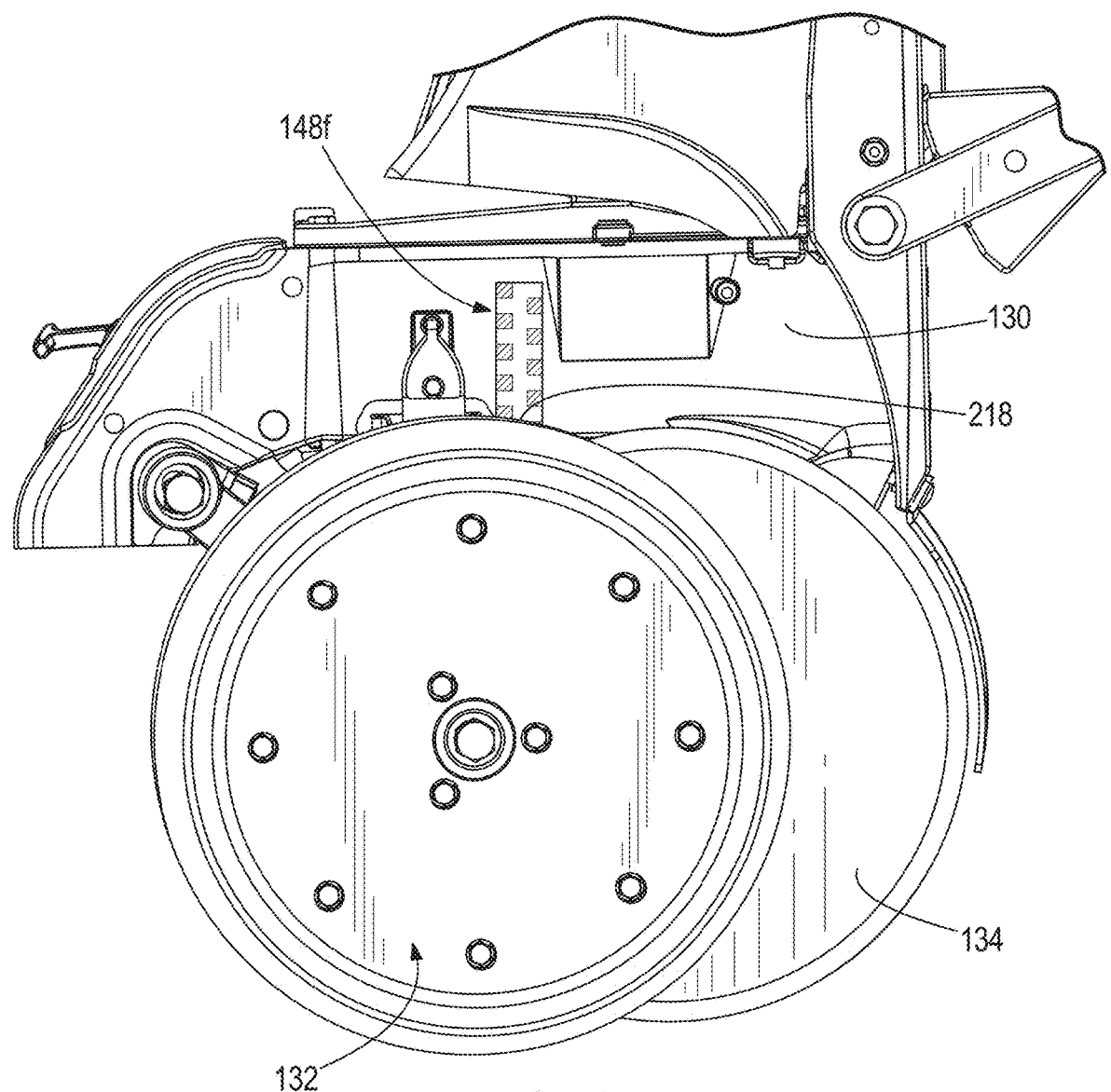
FIG. 10 is a side view of one of the gauge wheels, as well as a position sensor that detects an edge of the side wheel.

With reference to FIG. 10, in some constructions the position sensor 148f is a wheel edge sensor coupled to the sub-frame 130 and positioned to detect a position (e.g., height) of an edge 218 of one or more of the gauge wheels 132. The position of the edge 218 is then used to calculate the depth 154 of the furrow 136. In some construction the wheel edge position sensor 148f is an optical sensor, a capacitive sensor, an ultrasonic sensor, a Hall Effect sensor, or a magneto-resistive sensor, although other constructions include different types of sensors (see for example the sensing elements 570 in U.S. Publication No. 2017/0086349, the entire contents of which are incorporated herein by reference). In some constructions, the edge 218 is the radially outward most edge of a metallic rim of the gauge wheel 132. In some constructions the edge 218 of the gauge wheel 132 includes at least one magnet or reflector, and the position sensor 148f detects the magnet or reflector as it passes by the position sensor 148f. In some constructions the Hall Effect sensor, magneto-resistive sensor, or other sensor is coupled to the gauge wheel 132, and a magnet or reflector is instead coupled to the sub-frame 130. In some constructions the controller 178 receives a signal from the position sensor 148f relating to the edge 218 and determines a height of the gauge wheel 132 relative to the sub-frame 130. As illustrated in FIG. 10, the wheel edge position sensor 148f is or forms part of a vertical structure positioned adjacent the edge 218 of the gauge wheel 132. In some constructions one wheel edge position sensor 148f is positioned adjacent each gauge wheel 132 to separately measure the position of each gauge wheel 132. In some constructions signals from the wheel edge position sensors 148f are sent to the controller 178 (e.g., to be averaged together to calculate a single measured depth 154). Other constructions include different shapes, sizes, and positions for the wheel edge position sensor 148f than that illustrated. Additionally, in the illustrated construction the edge 218 is an outer edge of the gauge wheel 132. In other constructions the position sensor 148f may monitor other portions of the gauge wheel 132. For example, the gauge wheel 132 may include a radially inner metal portion having an outer rim, and an annular rubber or plastic tire portion coupled to the outer rim and surrounding the metal portion. The position sensor 148f may detect the outer rim of the metal portion to detect wear of the metal portion. The row unit 118 may also include one or more additional sensors to detect and monitor wear of the rubber tire portion. In some constructions the controller 178 may calibrate to take into account actual or anticipated wear of the rubber portion.

Figure 11:
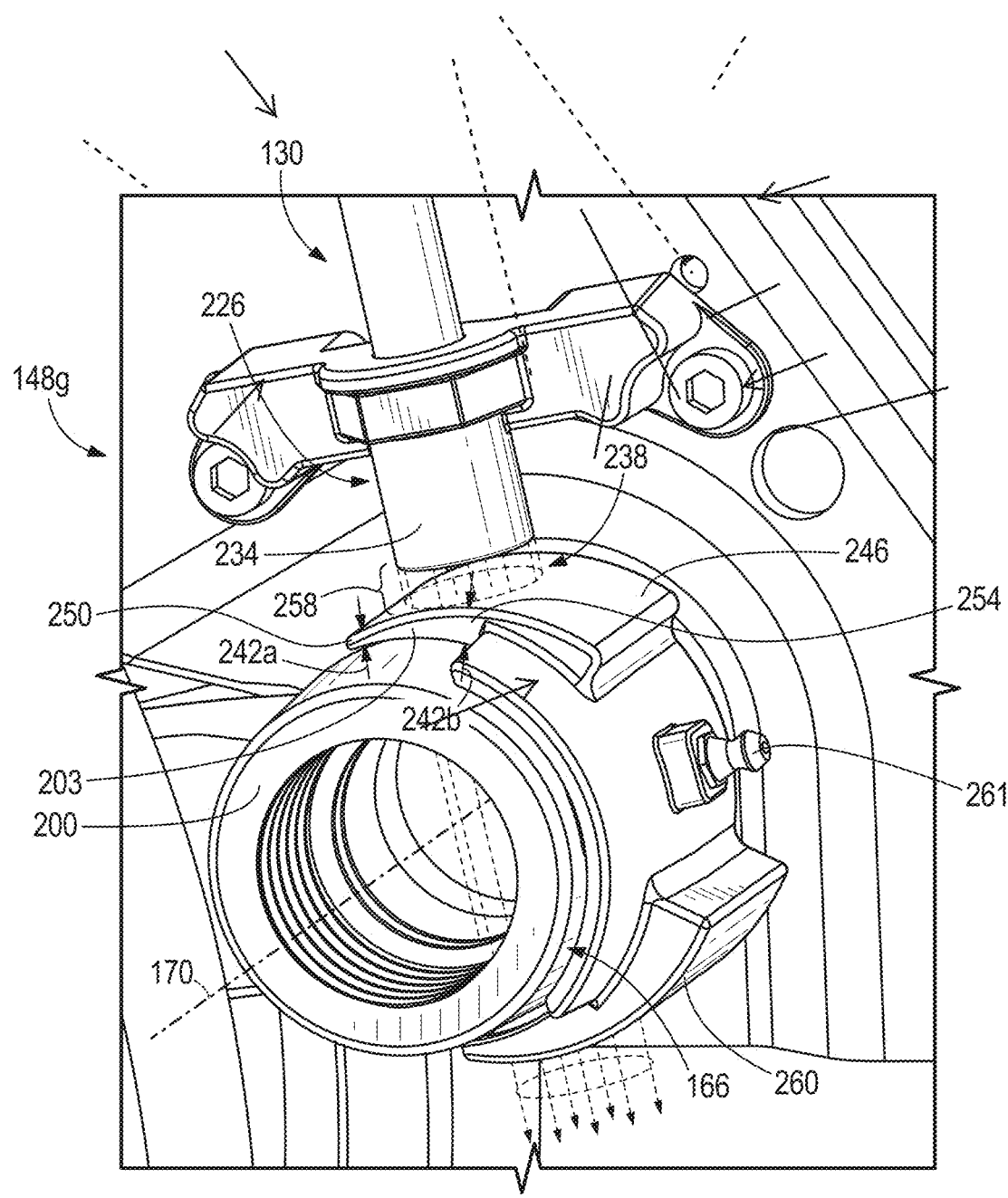
FIG. 11 is a perspective view of one of the gauge wheel arms, as well as a position sensor in the form of an assembly that includes a sensing element and a sensed surface.

With reference to FIG. 11, in some constructions the position sensor 148g is an assembly that includes a sensing element 226 coupled to the sub-frame 130 (e.g., to a stationary shank of the sub-frame 130) which detects the distance between the sensing element 226 and a surface of the rotating gauge wheel arm 166. In the illustrated construction the sensing element 226 is positioned on (e.g., fixed to) and carried by the sub-frame 130. The gauge wheel arm 166 is formed with a sensing target surface 246 that varies non-linearly relative to the sensing element 226. In some constructions, the sensing target surface 246 is eccentric relative to the gauge wheel pivot axis 170 (i.e., the sensing target surface 246 is a surface having an eccentricity greater than zero). In some constructions, the sensing target surface 246 forms a cam surface. As the gauge wheel arm 166 pivots, the distance between the sensing element 226 and the sensing target surface 246 changes. In some embodiments the sensing target surface 246 is machined into or otherwise integrally forms part of a raised shoulder portion or portions 203 of the bearing section 200. Alternatively, the raised shoulder portion 203 is omitted and the sensing target surface 246 is formed in the generally cylindrical surface of the bearing section 200. In another alternative, the sensing target surface 246 is formed on a sensor target clip (e.g., made of ferrous and/or non-ferrous material) that is releasably coupled to the bearing section 200.

The sensing element 226 is a non-contact position sensor (e.g., an inductive proximity sensor, Hall Effect sensor, etc.) that detects a rotational position of the gauge wheel arm 166. In some embodiments, the sensing element 226 is positioned so as to be at least partially enclosed by the gauge wheels 132, and disposed below at least a portion of the sub-frame 130. The sensing element 226 includes a sensing portion 234 having at least one sensing surface (e.g., lower planar surface) that directly faces the sensing target surface 246 of the gauge wheel arm 166. As illustrated in FIG. 11, a three-dimensional projection 238 of the sensing surface bounded by an outer perimeter of the sensing portion 234 (i.e., an extended region or zone of detection within which the sensing target surface 246 may be detected), extends normally away from the sensing surface toward and perpendicular to the pivot axis 170, such that the pivot axis 170 extends through the three-dimensional projection 238. The dashed-line arrows illustrated in FIG. 11 represent the three-dimensional projection 238 extending away from the sensing portion 234 and passing through the bearing section 200, thus crossing paths with the pivot axis 170. It is noted, however, that in use the sensing portion 234 detects only the sensing target surface 246 itself. Thus, the portion of the projection 238 extending past the sensing target surface 246 in FIG. 11 is provided only to illustrate a position of the projection 238 relative to the pivot axis 170.

With continued reference to FIG. 11, the sensing target surface 246 is sensed by the sensing element 226, which determines a proximity of the sensing target surface 246. The sensing target surface 246 is defined by a tapering thickness 242 on the raised shoulder portion 203. As illustrated in FIG. 11, the thickness 242a at a first portion 250 of the raised shoulder portion 203 is less than a thickness 242b at a second portion 254 of the raised shoulder portion 203. Because of this tapering thickness 242, a distance (i.e., gap) 258 between the sensing target surface 246 and the sensing element 226 decreases linearly as the gauge wheel arm 166 rotates counterclockwise about the pivot axis 170 (i.e., as the gauge wheel arm 166 lowers). In other words, the thickness 242 continuously increases moving clockwise around the sensing target surface 246, such that when the sensing target surface 246 rotates counterclockwise with the gauge wheel arm 166, the distance 258 continuously decreases.

Figure 12:
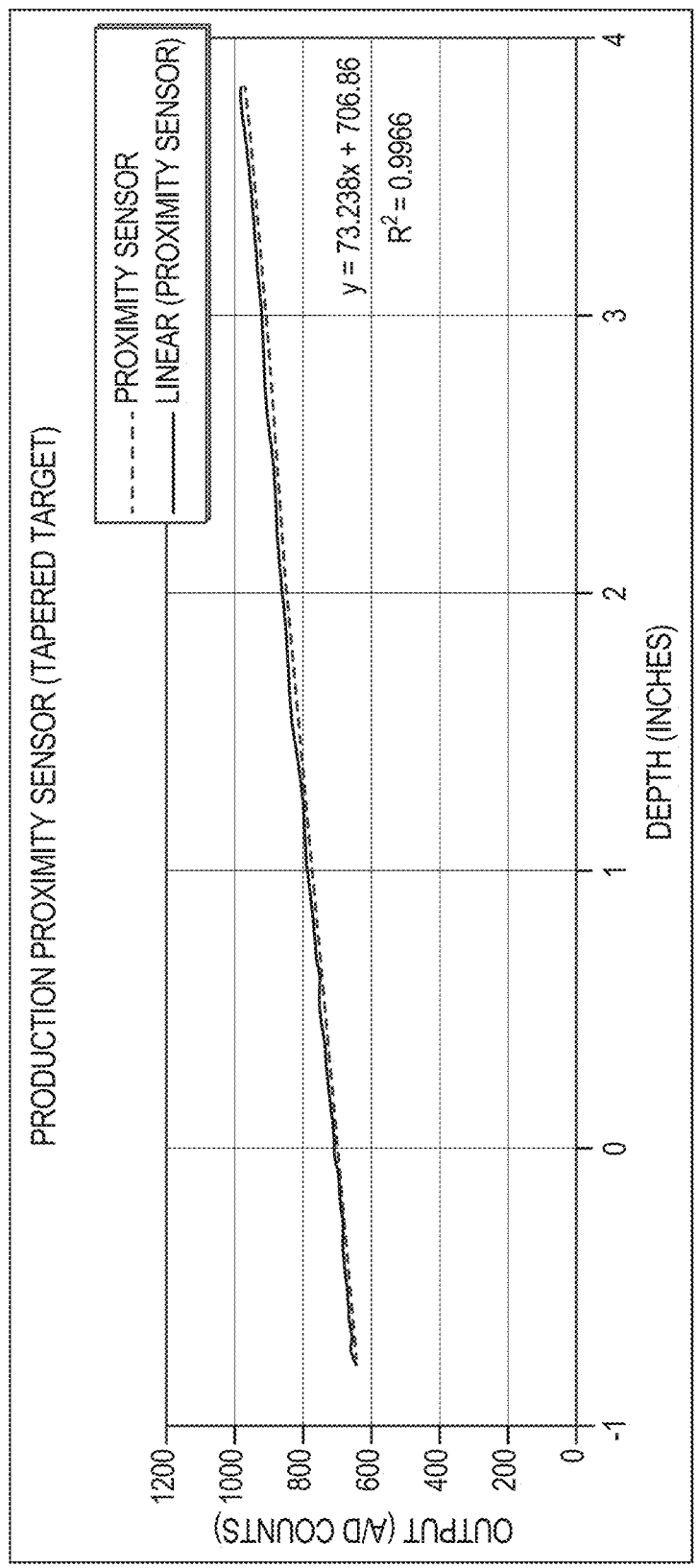
FIG. 12 is a graphical representation of the output of the position sensor of FIG. 11.

In the illustrated construction, the distance 258 is directly proportional to an angle of the gage wheel arm 166, and hence a depth of the furrow 136. Thus, as the distance 258 increases (representing a raising of the gauge wheel arm 166), the depth of the furrow 136 also increases. Conversely, as the distance 258 decreases, the depth of the furrow 136 also decreases. FIG. 12 illustrates an example of a relationship between a measured output of the sensing element 226 and the depth of the furrow 136, using a linear regression model.

In some constructions, the sensing target surface 246 (or a plane tangent thereto) is parallel to the sensing surface (or a plane tangent thereto) of the sensing portion 234 in a least one position of the gauge wheel arm 166 (e.g., as the gauge wheel arm 166 rotates, a tangency (i.e., a line or a plane tangent to the curve) of the sensing target surface 246 remains parallel to the sensing surface). This parallel arrangement facilitates detection of the sensing target surface 246 by the sensing portion 234 of the sensing element 226. In some constructions the sensing target surface 246 (or a plane tangent thereto) is parallel to a corresponding portion of the sensing surface of the sensing portion 234 at all points during rotation of the gauge wheel arm 166.

One advantage of forming the gauge wheel arm 166 with the sensing target surface 246 (or otherwise attaching the sensing target surface 246 to the gauge wheel arm 166) is that the sensing element 226 thereby measures an actual gauge wheel arm 166 position (and not, for example, just the position of a gauge wheel arm stop). In some constructions, and as illustrated in FIG. 11, another sensing target surface 260 is disposed along an opposite side of the bearing section 200, opposite a grease zurk 261. This enables the gauge wheel arm 166 to be used on either side of the row unit 118.

Figure 11A:
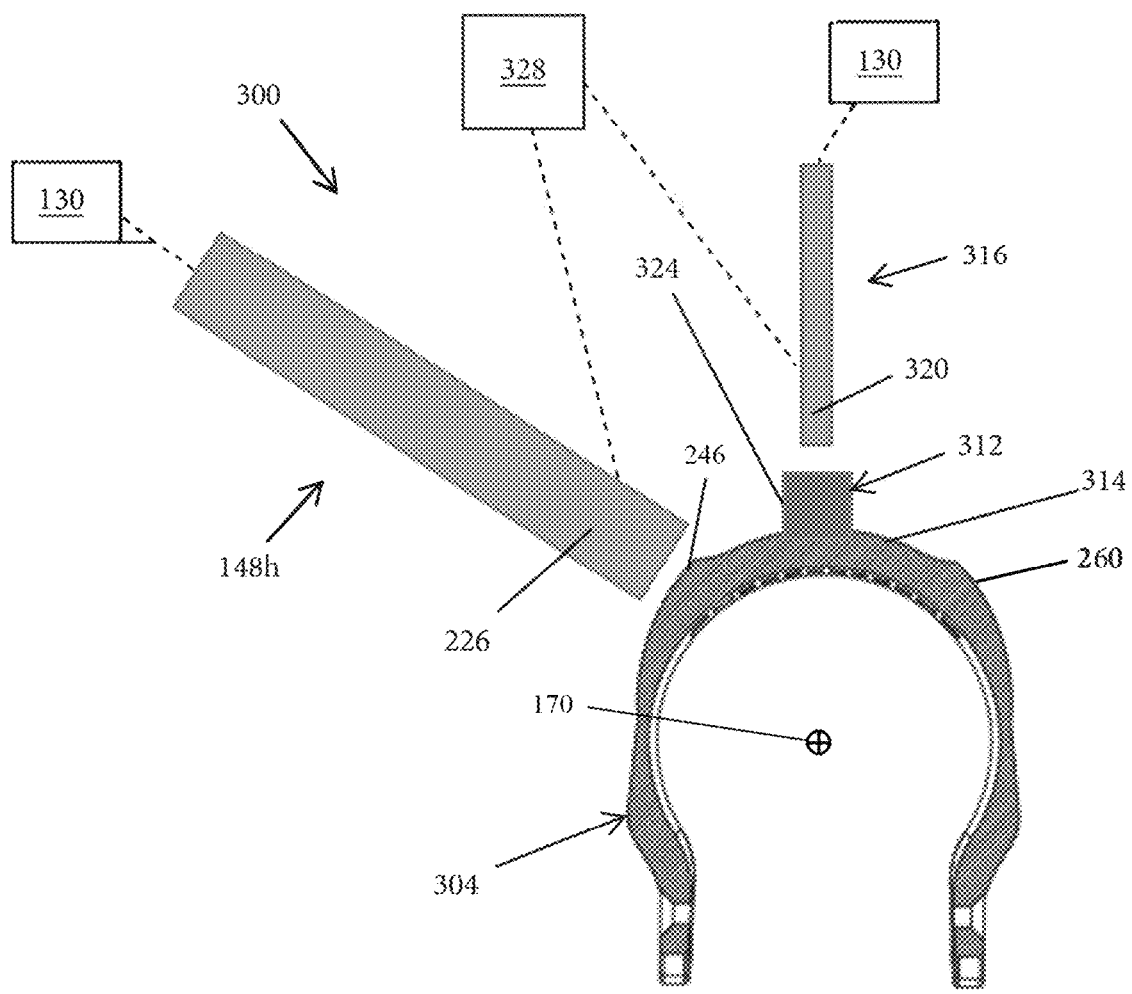
FIG. 11A is a schematic illustration of a compensation system for a position sensor.

FIG. 11A schematically illustrates a compensation system 300 for a position sensor. The system 300 is illustrated in the context of FIG. 11, and is used for example to provide position and temperature compensation for a position sensor 148h, which may be the same as position sensor 148g shown in FIG. 11, although the system 300 may be used to provide compensation for other position sensors (e.g., any of the position sensors described herein).

With reference to FIGS. 11 and 11A, the system 300 includes the position sensor 148h, which may be in the form of position sensor 148g described above, and the associated sensing element 226 coupled to (e.g., fixed to) the sub-frame 130. In the illustrated construction in FIG. 11A, the position sensor 148h is a non-contact, analog inductive proximity sensor. Other constructions include different types of sensors. As illustrated in FIG. 11A, the system 300 also includes a target element 304 in the form of a sensor target clip (e.g., ferrous metal clip). The target element 304 is clipped, for example, or otherwise coupled over the end of the gauge wheel arm 166, and includes a sensing target surface similar to the sensing target surface 246 illustrated in FIG. 11 that is detected by the position sensor 148h, and may optionally include a sensing target surface similar to the sensing target surface 260 of FIG. 11. For example, the target surface 246 may be eccentric relative to the gauge wheel pivot axis 170 (e.g., such that a distance between the position sensor 148h and the target surface 246 changes as the gauge wheel arm 166 rotates). In other constructions, rather than a sensor target clip, the target element 304 instead is a raised shoulder portion of the gauge wheel arm 166, and/or is integrally formed as a single piece with the gauge wheel arm 166.

With continued reference to FIG. 11A, the target element 304 includes a projection 312 extending away from an outer surface 314 of the target element 304. In the illustrated construction, the projection 312 extends away from the target surface 246. In other constructions, the projection 312 is spaced adjacent to the target surface 246. The projection 312 may take a variety of forms, including a rib, protrusion, spike, rod, thin plate, rectangular bar, etc. In some constructions, the projection 312 extends perpendicular to the outer surface 314 of the target element 304, or substantially perpendicular to the outer surface 314. In some constructions, the projection 312 is integrally formed as a single piece with the target element 304. In some constructions, the gauge wheel arm 166 extends along a longitudinal axis, and the longitudinal axis extends through the projection 312 (e.g., when the sensor target clip is coupled to the end of the gauge wheel arm 166). Other constructions include various other numbers, locations, sizes, and shapes for the projection 312 than that illustrated.

With continued reference to FIG. 11A, the system 300 further includes a compensation sensor 316. The compensation sensor 316 is coupled (e.g., fixed to) the sub-frame 130. The compensation sensor 316 includes a sensing element 320 that detects the projection 312. In the illustrated construction, the sensing element 320 is a non-contact position sensor (e.g., magnetic field sensor, gear-tooth sensor, inductive proximity sensor, back biased Hall Effect sensor, etc.). In some constructions, the seeding machine 10 is configured to rest on a ground surface, and the projection 312 is configured to extend vertically away from the ground surface when the projection 312 is detected by the compensation sensor 316.

With continued reference to FIG. 11A, the projection 312 includes a leading edge 324 (e.g., an edge extending perpendicular or substantially perpendicular to the outer surface of the target element 304, and/or forming a rapidly rising surface that extends toward the sensing element 320). The sensing element 320 is configured to detect when the leading edge 324 is directly below, or in proximity to, the sensing element 320, and/or when the leading edge 324 is moving past the sensing element 320. Other constructions include different types of sensors than that illustrated for the compensation sensor 316, as well as sensors that detect different surfaces or areas of the projection 312 than the leading edge 324.

With continued reference to FIG. 11A, in the illustrated construction the compensation sensor 316 and its sensing element 320 are spaced a fixed, predetermined distance from, and/or at a fixed angle relative to, the position sensor 148*h* (e.g., due to both elements being rigidly fixed to the sub-frame 130). This distance and/or angle remains fixed regardless of a rotational position of the gauge wheel arm 166 (and the attached target clip 304 and projection 312 rotating therewith).

In the illustrated construction, the system 300 further includes a controller 328 (e.g., having a processor, memory, etc.). The controller 328 is coupled to both the position sensor 148*h* and to the compensation sensor 316, and is programmed with knowledge of the predetermined distance or angle. In other constructions each sensor 148*h*, 316 may include its own associated (e.g., integrated) controller. The controller 328 is programmed to receive a signal or signals from the compensation sensor 316 in response to the compensation sensor 316 detecting the projection 312 (e.g., detecting the leading edge 324). The controller 328 is also programmed to receive a signal or signals from the position sensor 148 as the gauge wheel arm 166 is rotating. In some constructions, the controller 328 is disposed in a cab of the seeding machine 10, or on the sub-frame 130.

The compensation sensor 316 and the projection 312 are used to establish a zero reference position of the gauge wheel arm 166, and to re-reference or re-calibrate the position sensor 148*h* and/or the controller 324. For example, in some constructions, the compensation sensor 316 is used to detect the projection 312 when the seeding machine 10 is in, or only in, an inactive state (e.g., when the seeding machine 10 and/or the row unit 18 has been raised off of the ground). In this condition, the gauge arms 132 are hanging down, and the projection 312 is directly below the compensation sensor 316 (e.g., as illustrated in FIG. 11A). In contrast, during an active state, the seeding machine 10 is moving along a field, for example, and the gauge wheel arm 166 is rotating within a range of motion (e.g., within a 20 degree range, within a 30 degree range, etc. about the pivot axis 170) that does not place the projection 312 within detection range of the compensation sensor 316.

When the compensation sensor 316 detects the projection 312 (e.g., detects the leading edge 324), the compensation sensor 316 sends a signal to the controller 324 (e.g., indicating an absolute position of the target element 304 relative to the position sensor 148*h*). Because the controller 324 knows the fixed distance and/or angle between the position sensor 148*h* and the compensation sensor 316, the controller 324 is able to re-reference, or re-calibrate the controller 324 (or to re-reference or re-calibrate the controller position sensor 148*h* itself). This re-referencing, or re-calibration, effectively removes effects from temperature drifts, run out, wear, etc. that may have occurred in the position sensor 148*h* and that affect output voltages and the signals sent by the position sensor 148*h* to the controller 324. Without the re-referencing or re-calibration, the signals sent by the position sensor 148*h* may begin to change and be misinterpreted by the controller 324, giving inaccurate information about the actual rotational position of the gauge wheel arm 166. By using the compensation sensor 316 to detect the projection 312, the controller 324 is able to re-set a zero reference position of the gauge wheel arm 166 relative to the position sensor 148*h*. The controller 328 can then use this re-set zero reference position to determine how far the gauge wheel arm 166 later rotates relative to the re-set zero reference position. In some constructions, once the seeding machine 10 has been used for a predetermined period of time or for a predetermined number of uses, the seeding machine 10 and/or row unit 18 can then again be raised off the ground, and the compensation sensor 316 can be used again a second time to re-calibrate the controller 324 and establish a re-set zero reference position.

In some constructions, the system 300 may be used on other machines, including tillage machines, mower decks, construction and forestry machines, harvesters, or other machines (e.g., agricultural or industrial) that use a pivoting arm or other implement (e.g., similar to the pivoting gauge wheel arm 166). For example, in some constructions the system 300 may be used on soil tillage machines, vertical tillage machines, deep tillage machines, row crop cultivators, field cultivators, wheeled harvesters, loaders, bunchers, or various other machines. On these other machines the compensation sensor 316 may be used to re-reference or re-calibrate a position sensor that is detecting an angular position of the pivoting arm or other implement.

With reference to FIGS. 2-12, in some constructions the position sensor(s) 148 described above are first calibrated before any measurements or calculations are made, and are subsequently re-calibrated one or more times after extensive use of the seeding machine 10 (e.g., once the furrow opener 134 begins to wear). For example, the position sensors 148 described above detect rotational positions of the gauge wheel arm or arms 166. However, in some constructions to fully calculate the depth 154, those rotational positions must be compared with known rotational positions of the gauge wheel arms 166 when the depth 154 of the furrow 136 is considered zero. To determine those known rotational positions, the row unit 118 may first be placed for example on a flat, hard surface (e.g., concrete), such that a bottom of the furrow opener 134 and bottoms of the gauge wheels 132 are all in contact with the concrete. The rotational positions of the gauge wheel arms 166 are then measured. Those measurements may then be used by the controller 178 to determine changes in the rotational positions of the gauge wheels 132 during operation, and to thereby fully calculate the depth 154. By using the position sensor or sensors 148, the actual depth 154 may be determined on a continuous basis.

In addition to sensing the depth 154, the position sensor 148 output signals may also or alternatively be used as a diagnostic tool. For example, if a gauge wheel 132 remains in the same position for an extended (e.g., predetermined) period of time, this may indicate a malfunction on the row unit 118 that is holding the gauge wheel 132 in place. Likewise, loss of a gauge wheel 132 (i.e., a missing gauge wheel 132 that is no longer coupled to the gauge wheel arm 166) may be indicated by the signals. While this is rare, loss of a gauge wheel 132 may otherwise be undetected for a long time. Thus, use of the position sensors 148 helps to alert the operator of a lost gauge wheel 132 (e.g., via an alert sent from the controller 178 upon receipt of the signals from the position sensor 148). Additionally, in some constructions the position sensor 148 may provide output signals that are used to indicate if the first gauge wheel arm 166 is out of an expected position by a predetermined magnitude or for a predetermined duration of time (e.g., the gauge wheel arm 166 is stuck and remaining in the same position) or is oscillating greater than a predetermined frequency about its pivot axis 170 (e.g., indicating further downforce may be needed to control or stabilize the gauge wheel arm 166), or if a differential between the two gauge wheels arms 166 is equal to or greater than a predetermined threshold and/or equal to or greater than a predetermined threshold for a predetermined amount of time (e.g., indicating that the two gauge wheel arms 166 are concurrently at different rotational positions for too great of a period of time).

With reference to FIG. 2, in some constructions the row unit 118 includes at least one further position sensor 150 positioned on or adjacent the seed firmer 144. The further position sensor 150 measures a rotational position of the seed firmer 144 relative to the sub-frame 130 (e.g., by detecting rotational movement of the seed firmer 144 relative to the sub-frame 130). For example, in the illustrated construction the seed firmer 144 is rigid is coupled to the sub-frame 130 via a four-bar pivoting linkage 222 (see for example U.S. Patent Publication No. 2017/0086360 and U.S. Patent Publication No. 2017/0086362, both of which are incorporated in their entireties herein, for examples of four-bar pivoting linkages). Other seed firmers 144 may include a single rigid bar or pivoting arm, and/or may include a pressing wheel to firm the seeds. The further position sensor 150 may be a potentiometer, accelerometer, or other sensor positioned on the seed firmer 144 (e.g., on the four-bar pivoting linkage 222). The further position sensor 150 measures a rotational position of the four-bar pivoting linkage 222 relative to the sub-frame 130. The further position sensor 150 may be any of a number of different types of sensors, including the types of sensors described above in conjunction with determining the rotational positions of the gauge wheel arms 166. For example, the further position sensor 150 may include a rotary potentiometer coupled to the seed firmer 144 (or four-bar linkage) and to the sub-frame, or may include any other rotary sensor coupled to a pivot point of the seed firmer 144. In some constructions the further position sensor 150 may include an over-the-shaft type of sensor, for example if the seed firmer 144 is of a type that pivots about a shaft. In some constructions the further position sensor 150 may include a sensing array coupled to the sub-frame 130 or seed firmer 144, and one or more magnets coupled to the seed firmer 144 or sub-frame 130 to detect the rotational position of the seed firmer 144. In some constructions the further position sensor 150 may include an accelerometer coupled to the seed firmer 144. In some constructions the position sensor or sensors 148 used to detect the rotational positions of the gauge wheel arms 166 are different types of sensors than the further position sensor 150 used to detect movement of the seed firmer 144.

With continued reference to FIG. 2, in some constructions the signal or signals from the further position sensor 150 are sent to the controller 178, along with the signal or signals from the position sensor or sensors 148 associated with the gauge wheel arms 166. The signals from these various position sensors 148, 150 indicate both a rotational position of the seed firmer 144 relative to the sub-frame 130 and a rotational position of the gauge wheels 132 relative to the frame. Using these signals, and assuming that the seed firmer 144 is in constant contact with the bottom 162 of the furrow 136 (e.g., the seed firmer may be spring biased downward into contact with the furrow bottom) and the gauge wheels 132 are in constant contact with the top surface 158 of the soil 20 (which may be confirmed for example by a separate load sensor on a gauge wheel adjustment mechanism), the controller 178 may continuously calculate the depth 154 without having to calibrate or re-calibrate the position sensors 148. This represents an actual depth measurement by analysis of the positions of a furrow following device (e.g., the seed firmer) and of a ground following device (e.g., the gauge wheel 132), each relative to the sub-frame 130.

Figure 13:
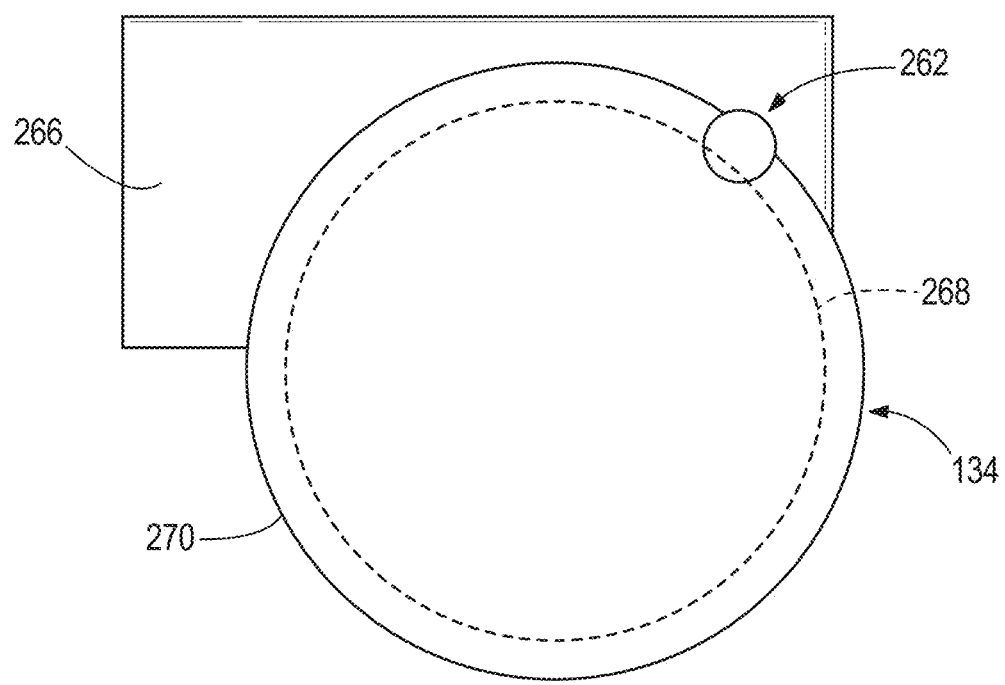
FIG. 13 is a schematic view of a sensor for measuring wear on a blade of a seeding machine.

With reference to FIG. 13, in some constructions the seeding machine 10 includes a sensor 262 (illustrated schematically) for measuring wear on the furrow opener 134 (or other blade on the seeding machine 10). In the illustrated construction the sensor 262 is an inductive proximity sensor coupled to the row unit 118 or other structure, although other constructions include different sensors (e.g., infrared, RF, optical, capacitive, etc.). The sensor 262 faces the furrow opener 134 (i.e., in a direction into the page in FIG. 13) and a shank 266 on the sub-frame 130. In other constructions the sensor 262 and/or shank 266 may be located elsewhere (e.g., the sensor 262 may be located on the shank 266 and may look out toward the furrow opener 134). In some constructions the sensor 262 is positioned to generally be free of dirt, moisture, etc., and is coupled to the sub-frame 130.

When the furrow opener 134 is new and unworn, the sensor 262 detects a predetermined portion of the furrow opener 134 (which is metallic in the illustrated construction). As the furrow opener 134 wears over time (e.g., to a diameter represented by the broken line 268 in FIG. 13), less of the furrow opener 134 is within a detectable region or projection of the sensor 262. Thus, the inductive response in the sensor 262 decreases with an increasing degree of furrow opener 134 wear. In some constructions, the furrow opener 134 includes a disk blade, and the sensor 262 is a disk blade wear sensor that provides wear indication directly to an operator. The sensor 262 may be mounted, for example, perpendicularly to the disk blade to detect an effective disk blade radius (i.e., to detect a reduction in an outer portion of the disk blade after wear of the disk blade, thus representing how a radius of the disk blade has been reduced).

In some constructions the sensor 262 may also or alternatively be used to monitor the quality of an outer edge of the furrow opener 134 (e.g., to detect roundness of the furrow opener 134, dents in the edge caused by rock strikes, etc.).

In some constructions the sensor 262 is coupled to a controller (e.g., the controller 178) to receive signals from the sensor 262. Signals from the sensor 262 corresponding to the level of wear of the furrow opener 134 may be used by the controller to control one or more elements on the seeding machine 10 (e.g., depth adjustment mechanisms such as a support adjustment bar and support roller like the support adjustment bar 62 and the support roller 72 in U.S. Pat. No. 4,413,685, or other stop members or mechanisms for setting a depth adjustment on a planting machine). In some constructions, the sensor 262 and/or the controller 178 are coupled to a display that displays wear of the furrow opener 134 (e.g., to an operator during use of the seeding machine 10). In some constructions, the controller 178 provides an alert if the furrow opener 134 wears beyond a predetermined amount.

In some constructions the seeding machine 10 includes both the sensor 262, as well as one or more of the position sensors 148 described above. Similar to the sensor 262, the sensor or sensors 148 may be coupled to a controller (e.g., the controller 178). The controller 178 monitors signals from the sensors 262, 148 to determine both an amount of wear on the furrow opener 134 (or other blade(s) on the seeding machine 10) as well as movement of the gauge wheel arms 166. This information is then used together to determine a depth of the furrow 136 and/or to control one or more elements on the seeding machine 10. As noted above, in some constructions one or more of the position sensors 148 are first calibrated before any measurements or calculations are made, and are subsequently re-calibrated one or more times after extensive use of the seeding machine 10 (e.g., once the furrow opener 134 begins to wear). By using the sensor 262, such re-calibration, or normalization, following the initial calibration is no longer required, since the wear of the furrow opener 134 is accounted for via the measurements from the sensor 262 (i.e., the sensor 262 is used for calibration or normalization).

Without use of the sensor 262, the controller 178 may assume that the furrow opener 134 has not worn, and that the furrow opener 134 is therefore penetrating into the furrow 134 in a consistent, identical manner with each use of the seeding machine 10. The controller 178 may assume also that a particular depth of the furrow 136 is being achieved based solely on a measured angle of the gauge wheel arms 166. With the additional use of the sensor 262, however, the controller 10 is able to take into account and compensate for wear of the furrow opener 134. Thus, when the sensor 262 provides signals that the furrow opener 134 has worn down, for example, from a first outer diameter 270 to the second outer diameter 268, this information may be evaluated by the controller 178 (e.g., used as an offset or compensation value after measuring the gauge wheel arm 166 positions with the positions sensor or sensor 148) when determining the actual depth of the furrow 136.

While various different types of positions sensor are described herein, the seeding machine 10 may include any one or more of the positions sensors, or a combination thereof. Additionally, any of the sensors (e.g., position sensors) described herein may be disposed between the gauge wheel arms and/or under at least a portion of the frame, and in some constructions one or more features of the sensors (e.g., the potentiometer, differential gearbox, sensing array, etc.) may be at least partially concealed from view between the gauge wheel arms when viewing the seeding machine along an axis of rotation of one of the gauge wheels. Additionally, the seeding machine 10 may use at least one controller, such as the controller 178, to receive signals from any of the position sensors described herein, and to use those signals to control one or more elements on the seeding machine 10 and/or to perform calculations relating to the seeding machine 10 (e.g., corresponding to furrow depth, positioning of components, etc.).

Following are several clauses describing various embodiments and concepts disclosed herein:

Clause 1. A seeding machine comprising a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a depth sensor coupled to both the first gauge wheel arm and the second gauge wheel arm, the depth sensor including a differential gearbox and a single potentiometer.

Clause 2. The seeding machine of clause 1, wherein the depth sensor includes a first link coupled to the first gauge wheel arm and a second link coupled to the second gauge wheel arm, wherein the differential gearbox includes a housing, a first bevel gear coupled to the first link and disposed at least partially within the housing, a second bevel gear coupled to the second link and disposed at least partially within the housing, a third bevel gear coupled to and disposed within the housing, and a fourth bevel gear coupled to and disposed within the housing, wherein the first bevel gear, the second bevel gear, the third bevel gear, and the fourth bevel gear are in engagement with one another such that rotational movement of the first gauge wheel arm causes an equal and opposite rotational movement of the second gauge wheel arm.

Clause 3. The seeding machine of clause 2, wherein the depth sensor further includes a ring gear fixed to the housing, and a fifth bevel gear engaged with the ring gear, wherein the fifth bevel gear is coupled to the single potentiometer.

Clause 4. The seeding machine of clause 2, wherein the first link arm is coupled to the first gauge wheel arm with a third link arm, and wherein the second link arm is coupled to the second gauge wheel with a fourth link arm.

Clause 5. The seeding machine of clause 1, wherein the differential gear box is at least partially enclosed by the first and second gauge wheels.

Clause 6. The seeding machine of clause 1, wherein the depth sensor is a first sensor, wherein the seeding machine includes a furrow opener and a second sensor to detect wear of the furrow opener.

Clause 7. The seeding machine of clause 1, further comprising a controller in communication with the depth sensor, wherein the depth sensor outputs signals corresponding to positions of the gauge wheel arms, and wherein the controller is configured to provide an alert if one of the gauge wheel arms is missing or if one of the gauge wheel arms has remained in a same position for a predetermined period of time.

Clause 8. A seeding machine comprising a frame, a gauge wheel arm pivotally coupled to the frame, a gauge wheel coupled to the gauge wheel arm, and a position sensor assembly configured to detect a rotational position of the gauge wheel arm, the position sensor assembly including an eccentric surface.

Clause 9. The seeding machine of clause 8, wherein the position sensor assembly includes an inductive proximity sensor positioned on and carried by the frame, the inductive proximity sensor configured to detect a proximity of the eccentric surface.

Clause 10. The seeding machine of clause 9, wherein the gauge wheel arm includes a bearing section having a raised shoulder portion with a tapered thickness, the raised shoulder portion defining the eccentric surface such that as the gauge wheel arm pivots relative to the frame, a distance between the inductive proximity sensor and the eccentric surface changes.

Clause 11. The seeding machine of clause 9, wherein a distance between the eccentric surface and the inductive proximity sensor changes as the gauge wheel arm is rotated.

Clause 12. The seeding machine of clause 8, wherein a ferrous clip is releasably coupled to an end of the gauge wheel arm, the ferrous clip including the eccentric surface.

Clause 13. The seeding machine of clause 8, wherein the gauge wheel arm is rotatable about a pivot axis, wherein the position sensor assembly includes a sensing element having a sensing surface that faces the pivot axis.

Clause 14. The seeding machine of clause 13, wherein as the gauge wheel arm rotates, the eccentric surface remains parallel to the sensing surface.

Clause 15. The seeding machine of clause 13, wherein the sensing element is an inductive proximity sensor.

Clause 16. The seeding machine of clause 8, wherein the seeding machine includes a furrow opener, and wherein the position sensor assembly includes a sensor to detect wear of the furrow opener.

Clause 17. The seeding machine of clause 8, further comprising a controller in communication with the position sensor assembly, wherein the position sensor assembly provides outputs signals corresponding to a position of the gauge wheel arm, and wherein the controller is configured to provide an alert if the gauge wheel arm is missing or the gauge wheel arm has remained in a same position for a predetermined period of time.

Clause 18. A seeding machine comprising a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor and a linkage coupled between the first gauge wheel arm and the position sensor.

Clause 19. The seeding machine of clause 18, wherein the position sensor includes a potentiometer.

Clause 20. The seeding machine of clause 18, wherein the position sensor includes a differential gearbox.

Clause 21. The seeding machine of clause 18, wherein the position sensor is a first position sensor and the linkage is a first linkage, wherein the position sensor assembly includes a second position sensor and a second linkage coupled between the second gauge wheel arm and the second position sensor.

Clause 22. The seeding machine of clause 18, wherein the linkage is a first linkage, wherein the position sensor assembly includes a second linkage coupled between the second gauge wheel arm and the position sensor.

Clause 23. The seeding machine of clause 18, wherein the position sensor is disposed below the frame.

Clause 24. The seeding machine of clause 18, wherein the seeding machine includes a furrow opener, and wherein the position sensor assembly includes a sensor to detect wear of the furrow opener.

Clause 25. The seeding machine of clause 18, further comprising a controller in communication with the position sensor, wherein the position sensor outputs signals corresponding to a position of the first gauge wheel arm, and wherein the controller is configured to provide an alert if the first gauge wheel arm is missing or if the first gauge wheel arm has remained in a same position for a predetermined period of time Clause 26. A seeding machine comprising a frame. a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor disposed between the first gauge wheel arm and the second gauge wheel arm such that the position sensor is at least partially concealed from view between the first and second gauge wheels when viewing the seeding machine along an axis of rotation of the first gauge wheel.

Clause 27. The seeding machine of clause 26, wherein the position sensor includes a potentiometer.

Clause 28. The seeding machine of clause 26, wherein the position sensor includes a differential gearbox.

Clause 29. The seeding machine of clause 26, wherein the position sensor includes an accelerometer.

Clause 30. The seeding machine of clause 26, wherein the position sensor includes an inductive proximity sensor.

Clause 31. The seeding machine of clause 26, wherein the seeding machine includes a furrow opener, and wherein the position sensor assembly includes a sensor to detect wear of the furrow opener.

Clause 32. The seeding machine of clause 26, further comprising a controller in communication with the position sensor, wherein the position sensor outputs signals corresponding to a position of the first gauge wheel arm, and wherein the controller is configured to provide an alert if the first gauge wheel arm is missing or if the first gauge wheel arm has remained in a same position for a predetermined period of time.

Clause 33. A seeding machine comprising a frame, a furrow opener coupled to the frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a first position sensor to detect a rotational movement of the first gauge wheel arm, the position sensor assembly further including a second position sensor to detect wear of the furrow opener.

Clause 34. The seeding machine of clause 33, wherein the first position sensor is configured to detect a rotational movement of both the first gauge wheel arm and the second gauge wheel arm.

Clause 35. The seeding machine of clause 33, wherein the first position sensor includes a potentiometer.

Clause 36. The seeding machine of clause 33, wherein the position sensor assembly includes a controller, wherein the controller is configured to receive signals from both the first position sensor and the second position sensor, and to use the signals to determine a depth of a furrow.

Clause 37. The seeding machine of clause 36, wherein the controller is configured to provide an alert if one of the gauge wheel arms is missing or if one of the gauge wheel arms has remained in a same position for a predetermined period of time.

Clause 38. The seeding machine of clause 33, wherein the position sensor is at least partially enclosed by the first and second gauge wheels.

Clause 39. A seeding machine comprising a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor to detect a rotational movement of the first gauge wheel arm, and a controller in communication with the position sensor, wherein the position sensor outputs signals corresponding to a position of the gauge wheel arm, and wherein the controller is configured to provide an alert if the first gauge wheel is missing or if the first gauge wheel arm has remained in a same position for a predetermined period of time.

Clause 40. The seeding machine of clause 39, wherein the position sensor includes a potentiometer.

Clause 41. The seeding machine of clause 39, wherein the position sensor includes an inductive proximity sensor.

Clause 42. The seeding machine of clause 39, wherein the position sensor includes an accelerometer.

Clause 43. The seeding machine of clause 39, wherein position sensor is at least partially enclosed by the first and second gauge wheels.

Clause 44. A seeding machine comprising a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor that includes a single sensing array positioned between the first gauge wheel arm and the second gauge wheel arm.

Clause 45. The seeding machine of clause 44, wherein the single sensing array includes a Hall Effect sensor.

Clause 46. The seeding machine of clause 45, wherein the position sensor includes a first magnet coupled to the first gauge wheel arm configured to be detected by the Hall Effect sensor.

Clause 47. The seeding machine of clause 46, wherein the position sensor includes a second magnet coupled to the second gauge wheel arm configured to be detected by the Hall Effect sensor.

Clause 48. The seeding machine of clause 44, wherein the single sensing array is at least partially enclosed by the first and second gauge wheels.

Clause 49. The seeding machine of clause 44, wherein the seeding machine includes a furrow opener, and wherein the position sensor assembly includes a sensor to detect wear of the furrow opener.

Clause 50. The seeding machine of clause 44, further comprising a controller in communication with the position sensor, wherein the position sensor outputs signals corresponding to a position of the first gauge wheel arm, and wherein the controller is configured to provide an alert if the first gauge wheel arm is missing or if the first gauge wheel arm has remained in a same position for a predetermined period of time.

Clause 51. A seeding machine comprising a frame, a first gauge wheel arm pivotally coupled to the frame, a first gauge wheel coupled to the first gauge wheel arm, a second gauge wheel arm pivotally coupled to the frame, a second gauge wheel coupled to the second gauge wheel arm, and a position sensor assembly having a position sensor that includes an accelerometer coupled to the first gauge wheel arm to measure movement of the first gauge wheel arm.

Clause 52. The seeding machine of clause 51, wherein the accelerometer is mounted directly on the first gauge wheel arm.

Clause 53. The seeding machine of clause 51, wherein the accelerometer is a first accelerometer, wherein the position sensor assembly includes a second accelerometer coupled to the second gauge wheel arm to measure movement of the second gauge wheel arm.

Clause 54. The seeding machine of clause 51, wherein the accelerometer is at least partially enclosed by the first and second gauge wheels.

Clause 55. The seeding machine of clause 51, wherein the seeding machine includes a furrow opener, and wherein the position sensor assembly includes a sensor to detect wear of the furrow opener.

Clause 56. The seeding machine of clause 51, further comprising a controller in communication with the position sensor, wherein the position sensor outputs signals corresponding to a position of the first gauge wheel arm, and wherein the controller is configured to provide an alert if the first gauge wheel arm is missing or if the first gauge wheel arm has remained in a same position for a predetermined period of time.

Clause 57. A seeding machine comprising a frame, a furrow opener coupled to the frame, and a position sensor assembly having a position sensor that faces the furrow opener and detects wear of the furrow opener.

Clause 58. The seeding machine of clause 57, wherein the position sensor is an inductive proximity sensor.

Clause 59. The seeding machine of clause 57, wherein the frame includes a shank, wherein the position sensor faces both the furrow opener and the shank.

Clause 60. The seeding machine of clause 57, wherein the frame includes a shank, wherein the position sensor is coupled to the shank and faces away from the shank and toward the furrow opener.

Clause 61. A seeding machine comprising a frame, a ground following device coupled to the frame. a furrow following device coupled to the frame, and a position sensor assembly having a first position sensor that detects movement of the ground following device and a second position sensor that detects movement of the furrow following device.

Clause 62. The seeding machine of clause 61, wherein the ground following device includes a gauge wheel arm pivotably coupled to the frame and the furrow following device includes a seed firmer.

Clause 63. The seeding machine of clause 62, wherein the seed firmer pivots relative to the frame at a pivot point, and wherein a rotary sensor is disposed on the pivot point.

Clause 64. The seeding machine of clause 62, wherein the seed firmer is coupled to the frame via a four-bar pivoting linkage.

Clause 65. The seeding machine of clause 64, wherein the second position sensor is a rotary potentiometer coupled to the four-bar pivoting linkage and the frame.

Various features and advantages of the disclosure are set forth in the following claims.

What is claimed is:

1. An agricultural machine comprising:
a frame;
an arm pivotally coupled to the frame at a first end of the arm;
a target element on the first end of the arm, wherein the target element is configured to rotate with the arm, wherein the target element includes an outer surface and a projection extending away from the outer surface;
a first sensor fixed to the frame, wherein the first sensor is configured to detect the outer surface; and
a second sensor fixed to the frame, wherein the second sensor is configured to detect the projection.

2. The agricultural machine of claim 1, further comprising a controller configured to receive a signal from both the first sensor and the second sensor.

3. The agricultural machine of claim 2, wherein the controller is configured to re-calibrate the first sensor to correct for temperature drift in the first sensor based on the signal received from the second sensor and a known, fixed distance between the first sensor and second sensor.

4. The agricultural machine of claim 2, wherein the projection includes an edge, wherein the second sensor is configured to detect the edge, and wherein the controller is configured to indicate an absolute position of the target element to the first sensor based on the detection of the edge.

5. The agricultural machine of claim 1, wherein the first sensor is an analog inductive proximity sensor.

6. The agricultural machine of claim 1, wherein the second sensor is a magnetic field sensor.

7. The agricultural machine of claim 6, wherein the second sensor is a Hall effect sensor.

8. The agricultural machine of claim 1, wherein at least a portion of the outer surface defines an eccentric surface along the target element, and wherein a distance between the first sensor and the eccentric surface is configured to change as the arm rotates.

9. The agricultural machine of claim 1, wherein the arm is configured to rotate during active use of the machine in a field, wherein the projection is positioned along the target element such that the projection is configured to be detected by the second sensor when the machine has been raised and is in an inactive state.

10. The agricultural machine of claim 1, wherein the arm extends along a longitudinal axis, and wherein the longitudinal axis extends through the projection.

11. The agricultural machine of claim 1, wherein the machine is configured to operate on a ground surface, and wherein the projection is configured to extend vertically away from the ground surface when the machine is in an inactive state.

12. The agricultural machine of claim 1, wherein the target element is integrally formed as one piece with the first end of the gauge wheel arm.

13. The agricultural machine of claim 12, wherein the target element is a raised shoulder portion of the first end of the gauge wheel arm.

14. The agricultural machine of claim 1, wherein the target element is a ferrous metal clip coupled to the first end of the gauge wheel arm.

15. The agricultural machine of claim 1, wherein the arm is a gauge wheel arm, wherein the gauge wheel arm includes a second end opposite the first end, and wherein a gauge wheel is coupled to the second end.

* * * * *